United States Patent

Bargain et al.

[11] 4,233,427
[45] Nov. 11, 1980

[54] ELASTOMERIC ORGANOPOLYSILOXANE BLOCK COPOLYMERS AND NON-ELASTOMERIC ORGANOSILICIC COPOLYMER BLOCKS THEREFOR

[75] Inventors: Michel Bargain; Christian Prud'Homme, both of Lyon, France

[73] Assignee: Rhone-Poulenc Industries, Paris, France

[21] Appl. No.: 3,885

[22] Filed: Jan. 16, 1979

[30] Foreign Application Priority Data

Jan. 16, 1978 [FR] France .................. 78 01048

[51] Int. Cl.$^3$ .................. C08G 77/42; C08G 77/20; C08G 77/12
[52] U.S. Cl. .................. 525/478; 528/15; 528/31
[58] Field of Search .................. 260/825, 448.2 B; 525/478; 528/31

[56] References Cited

U.S. PATENT DOCUMENTS

| | | | |
|---|---|---|---|
| 3,162,663 | 12/1964 | Beck | 260/825 |
| 3,249,580 | 5/1966 | Beck | 260/825 |
| 4,145,508 | 3/1979 | Bargain et al. | 260/825 |

*Primary Examiner*—Wilbert J. Briggs, Sr.
*Attorney, Agent, or Firm*—Burns, Doane, Swecker & Mathis

[57] ABSTRACT

Thermoplastic, crystalline block copolymers are disclosed, each comprising a plurality of recurring units selected from the group consisting of those of the structural formulae $F_1$ and $F'_1$, and combinations thereof:

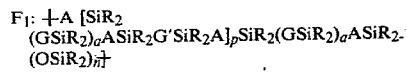

and

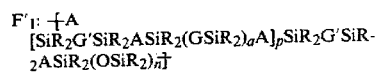

in which
the symbols A, which are identical, represent linear or branched chain alkylene radicals having from 2 to 6 carbon atoms, or cyclohexylene radicals;
the symbols R, which are identical or different, represent alkyl and halogenoalkyl radicals having from 1 to 5 carbon atoms, cycloalkyl and halogenocycloalkyl radicals having from 3 to 8 carbon atoms, aryl and halogenoaryl radicals having from 6 to 8 carbon atoms or cyanoalkyl radicals having from 3 to 4 carbon atoms;
the symbols G, which are identical, represent linear or branched chain alkylene radicals having from 1 to 8 carbon atoms, divalent organic radicals corresponding to the formula $F_2$: $-(CH_2)_x QTQ(CH_2)_x-$, in which the symbols Q, which are identical, represent one of the groups $-O-$ and $-OCO-$, the $-OCO-$ being bonded to T by the $-CO-$ radical, the symbol T represents a monocyclic, divalent hydrocarbon radical having from 6 to 8 carbon atoms, or a divalent organic radical which has from 10 to 22 carbon atoms and consists of 2 hydrocarbon rings which are fused to one another or bonded together by a valence bond or by one of the groups of the formulae $-O-$, $-CH_2-$, $-C(CH_3)_2-$ and $-Si(R'-)_2$, wherein R' is an alkyl radical having from 1 to 3 carbon atoms, and the symbols x, which are identical represent 1, 2 or 3, or divalent hydrocarbon radicals corresponding to the formula $F_3$: $-(CH_2)_b T(CH_2)_b-$, in which the symbol T has the measuring given for the formula $F_2$ and the symbols b, which are identical, represent 0 or 1; s
the symbols G', which are identical, have the meaning given above for G, except that they do not correspond to the formula $F_2$;
the symbols a, which are identical, represent 0 or 1;
the symbols p represents any number ranging from 1 to 120; and
the symbol n represents any number ranging from 1 to 1,500.

34 Claims, No Drawings

ELASTOMERIC ORGANOPOLYSILOXANE BLOCK COPOLYMERS AND NON-ELASTOMERIC ORGANOSILICIC COPOLYMER BLOCKS THEREFOR

BACKGROUND OF THE INVENTION

1. Field of the Invention

The present invention relates to novel thermoplastic, crystalline, organopolysiloxane block copolymers having elastomeric properties, and also to a process for the preparation of such block copolymers by hydrosilylation.

The present invention further relates to certain novel non-elastomeric, crystalline organosilicic copolymers [as well as to the process for their preparation, also by hydrosilylation], which copolymers comprise the rigid blocks of the organopolysiloxane block copolymers.

2. Description of the Prior Art

Amorphous, thermoplastic organopolysiloxane copolymers are known which have elastomeric properties and which are prepared by hydrosilylation of compounds which can easily be purified, by rectification or crystallization, and which bear two SiH groups, with compounds which have the same properties and bear two groups of Si-vinyl type [French Patent Application No. 2,300,779].

These copolymers simultaneously possess the properties of silicone elastomers [excellent resistance to chemical and atmospheric agents] and those of thermoplastic polymers, in particular ease of processing.

However, these non-crystalline copolymers do not withstand high thermal stresses; thus, their modulus of elasticity falls very rapidly at temperatures approaching 100° C. and this prevents their use, for example, in the form of films or membranes in an atmosphere which is maintained in the region of this temperature.

Furthermore, crystalline organopolysiloxane copolymers are known which consist of polytetramethylsilphenylenesiloxane blocks of the formula:

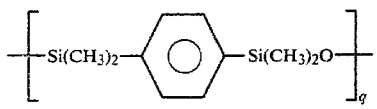

and polydimethylsiloxane blocks of the formula $+(Si(CH_3)_2O+_{q'}$, in which formulae the symbols q and q' represent the degree of condensation.

These copolymers can withstand fairly high thermal stresses, their modulus of elasticity falling sharply only at temperatures which are at least in the region of 130° C.

Various processes can be used for their preparation [article by R. L. Merker, M. J. Scott and G. G. Haberland in the *Journal of Polymer Science*, part A-2, 1964, no. 1, pages 31-44 and article by J. E. Curry and J. D. Byrd in the *Journal of APplied Polymer Science*, 1965, 9, no. 1, pages 295-311].

However, the process which has been studied most consists, in a first stage, in preparing the polytetramethylsilphenylenesiloxane block by polycondensation, with itself, of the diol of the formula:

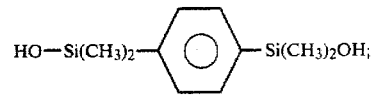

a polycondensation of this type is not easy to regulate and the desired degree of condensation is not always attained. This block is then condensed with a dimethyl polysiloxane block which is terminated at each end of its chain by a dimethylamino group or a chlorine atom. This condensation generates dimethylamine or hydrogen chloride gas, which should, in principle, be completely removed.

These copolymers are therefore difficult to obtain.

SUMMARY OF THE INVENTION

The present invention relates to thermoplastic, crystalline, organopolysiloxane block copolymers which are easy to prepare and are resistant to high thermal stresses.

The subject copolymers comprise a plurality of recurring units corresponding to either or both of the following structural formulae:

$F_1$:
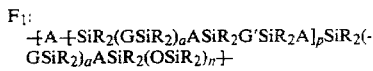

and $F'_1$:
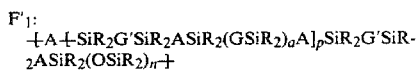

in which the various symbols have the following meaning:

the symbols A, which are identical, represent linear or branched chain alkylene radicals having from 2 to 6 carbon atoms, or cyclohexylene radicals;

the symbols R, which are identical or different, represent: alkyl and halogenoalkyl radicals having from 1 to 5 carbon atoms, cycloalkyl and halogenocycloalkyl radicals having from 3 to 8 carbon atoms, aryl and halogenoaryl radicals having from 6 to 8 carbon atoms, or cyanoalkyl radicals having from 3 to 4 carbon atoms;

the symbols G, which are identical, represent: linear or branched chain alkylene radicals having from 1 to 8 carbon atoms, divalent organic radicals corresponding to the formula $F_2$: $+CH_2+_xQTQ(CH_2+_x$, in which the symbols Q, which are identical, represent one of the groups —O— and —OCO— [—OCO— being bonded to T by the —CO— radical], the symbol T represents a monocyclic, divalent hydrocarbon radical having from 6 to 8 carbon atoms, or a divalent organic radical which has from 10 to 22 carbon atoms and consists of two hydrocarbon rings which are fused to one another or bonded together by a valence bond or by one of the groups of the formulae —O—, —CH$_2$—, —C(CH$_3$)$_2$— and —Si(R'$)_2$ [R' being an alkyl radical having from 1 to 3 carbon atoms], and the symbols x, which are identical, represent 1, 2 or 3, or divalent hydrocarbon radicals corresponding to the formula $F_3$: $(CH_2)_b$ —T—$(CH_2)_b$, in which the symbol T has the meaning given above for the formula $F_2$ and the symbols b, which are identical, represent 0 or 1;

the symbols G', which are identical, have the meaning given for G, except that they do not correspond to the formula F₂;

the symbols a, which are identical, represent 0 or 1;

the symbol p represents any number ranging from 1 to 120; and the symbol n represents any number ranging form 1 to 1,500.

DETAILED DESCRIPTION OF THE INVENTION

More precisely, the various symbols and linkages included in the formulae F₁, F₂ and F₃ can have the following meanings:

Symbols A

There are mentioned, by way of illustration, ethylene, 1,3-propylene, 1,2-propylene, 1,4-butylene, 1,3-butylene, 2,3-butylene, 1,5-pentylene, 1,4-pentylene, 1,6-hexylene, 2,4-hexylene, 1,4-cyclohexylene and 1,3-cyclohexylene radicals.

The symbols A preferably represent ethylene and 1,3-propylene radicals.

Symbols R

There are mentioned, by way of illustration: methyl, ethyl, n-propyl, n-butyl, n-pentyl and 3,3,3-trifluoropropyl radicals, cyclohexyl, methylcyclohexyl, 2,2-dichlorocyclopropyl, 2,2-difluorocyclopropyl and chlorocyclohexyl radicals, phenyl, tolyl, xylyl, chlorophenyl, dichlorophenyl, trichlorophenyl and trifluoromethylphenyl radicals, and β-cyanoethyl and γ-cyanopropyl radicals.

The symbols R preferably represent methyl, ethyl, n-propyl and phenyl radicals.

Symbols G and G'

These symbols represent:

linear or branched chain alkylene radicals having from 1 to 8 carbon atons.

There are mentioned, by way of illustration, methylene, ethylene, 1,3-propylene, 1,4-butylene, 2,3-butylene, 1,6-hexylene and 1,8-octylene radicals.

These alkylene radicals are preferably ethylene and 1,4-butylene radicals.

divalent organic radicals [except for the symbols G'] corresponding to the formula F₂: (CH₂)ₓQTQ(CH₂)ₓ, in which the symbol T represents divalent radicals selected from the group comprising:

[i] Monocyclic radicals of the formulae:

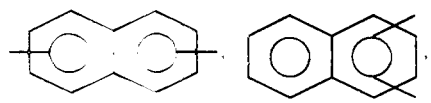

in which the sumbol c represents zero, 1 or 2 [The letter "S" indicates that the ring is saturated]; these monocyclic radicals are preferably para-phenylene or para-cyclohexylene radicals.

[ii] Bicyclic hydrocarbon radicals of the formulae:

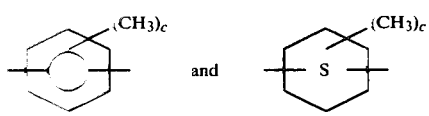

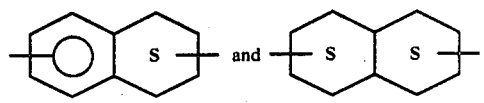

which are optionally substituted by one or two methyl radicals; these bicyclic radicals are preferably 1,5- and 2,7-naphthylene radicals.

[iii] Radicals formed from 2 phenylene and/or cyclohexylene rings [each ring being optionally substituted by one or 2 methyl radicals] which are bonded to one another by a single valence bond or by one of the groups —O—, —CH₂—, —C(CH₃)₂— and —Si(R')₂—; in this last group, the symbols R' represent methyl, ethyl or n-propyl radicals; radicals of this type which are mentioned by way of illustration are those of the formulae:

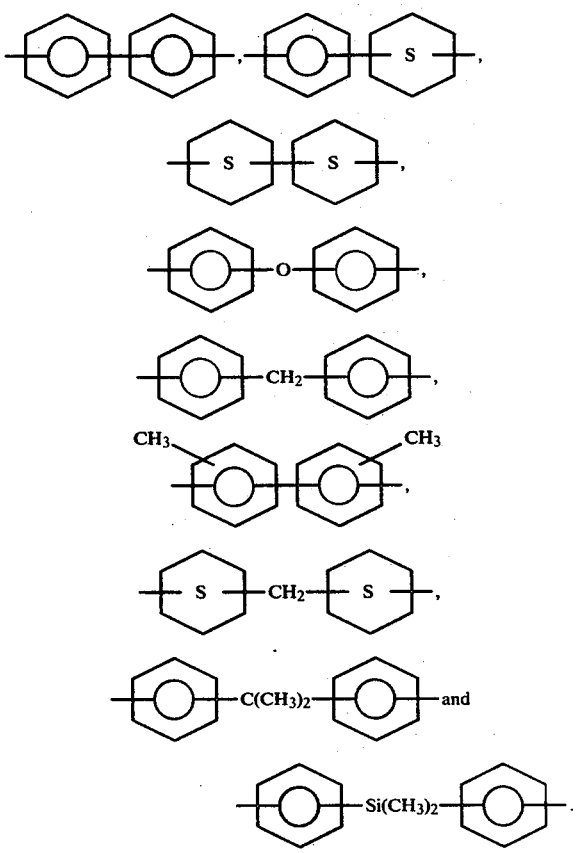

These radicals are preferably selected from among those of the formulae:

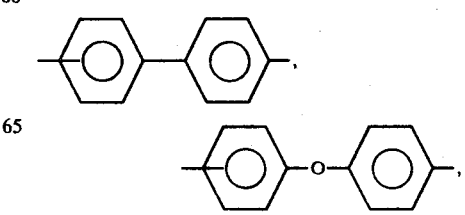

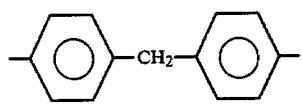

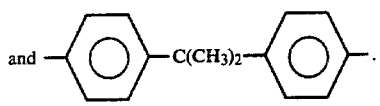

As a result of combining the various meanings of T with the various meanings of Q and x indicated above, the divalent organic radicals of the formula $F_2$ can correspond, by way of specific examples, to the following formulae:

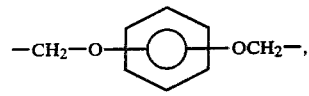

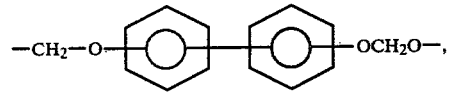

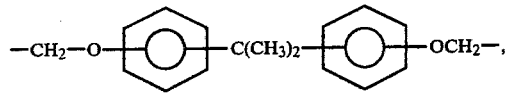

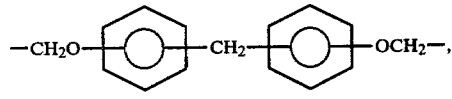

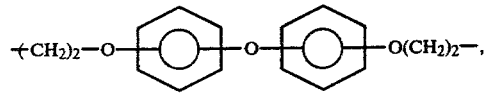

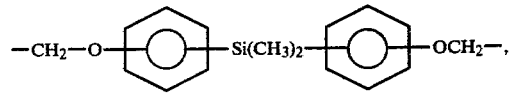

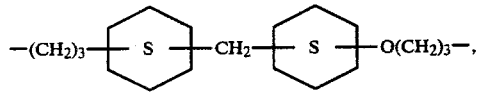

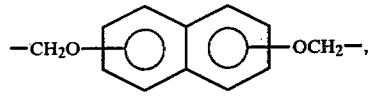

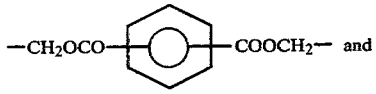

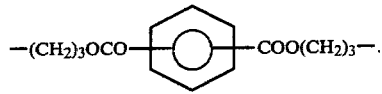

The divalent radicals of the formula $F_2$ preferably correspond to those of the following formulae:

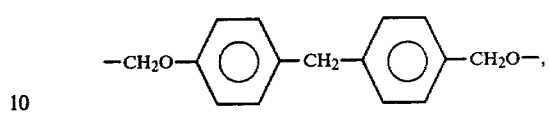

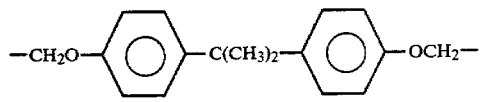

Divalent hydrocarbon radicals corresponding to the formula $F_3$: $-(CH_2)_b-T-(CH_2)_b-$.

On the basis of the various meanings of T and b explained above, the radicals corresponding to the following formulae are mentioned by way of specific examples of radicals of the formula $F_3$:

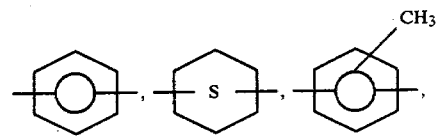

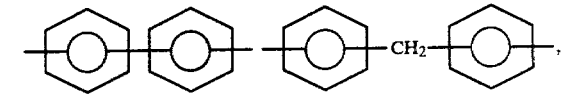

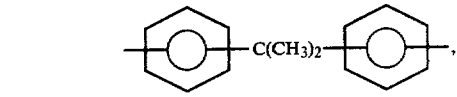

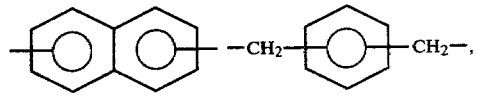

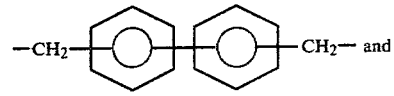

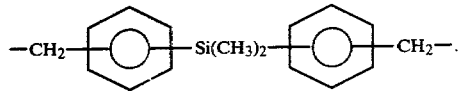

The radicals $F_3$ preferably correspond to the following formulae:

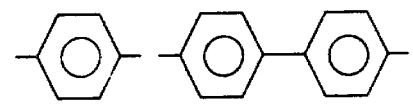

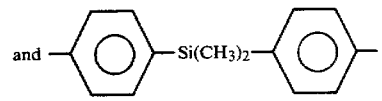

Symbols p

These symbols preferably represent any numbers ranging from 1 to 80.

Symbols n

These symbols preferably represent any numbers ranging from 10 to 800.

The formulae $F_1$ and $F'_1$ represent identical or different units, depending on the meanings of G, G' and a. Thus, the units are identical when, in the formulae $F_1$ and $F'_1$, the symbols a represent 1 at the same time as the symbols G are restricted to the meanings of G'.

In addition, if the symbols G are selected to be identical to G', the two formulae are transformed into a single formula $F''_1$:

$$-[A(SiR_2G'SiR_2A)_{2p}SiR_2G'SiR_2ASiR_2(OSiR_2)_n]-$$

which can be condensed into $-[A(SiR_2G'SiR_2A)_{2p+1}SiR_2(OSiK_2)_n]-$.

By way of specific examples of units corresponding to the formula $F_1$, there are mentioned those of the formulae:

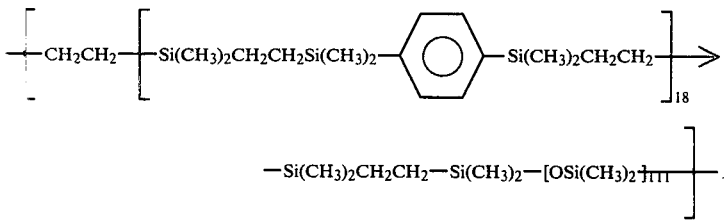

This formula is derived from the formula $F_1$ in which the symbols a represent zero.

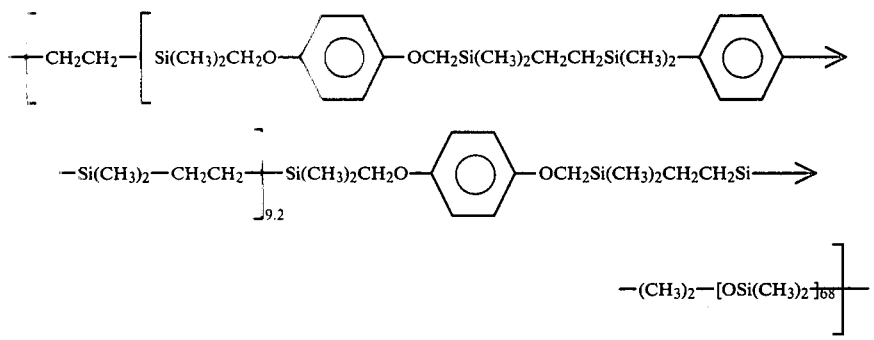

and

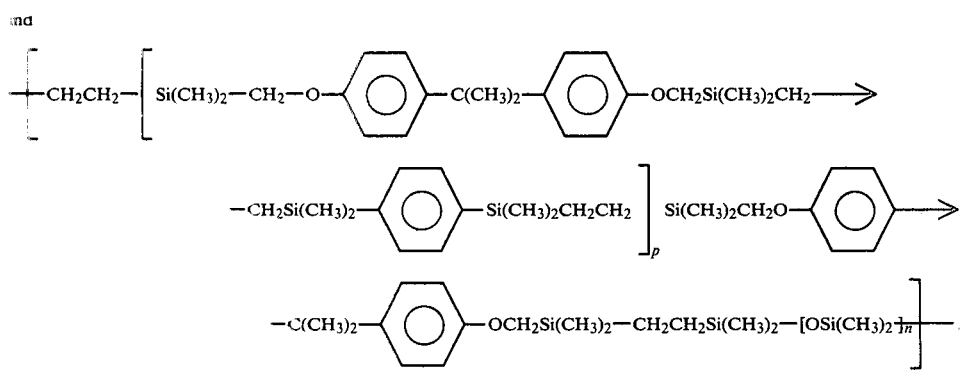

The values of p and n, taken in pairs, are as follows: 2 and 68; 3 and 37; 7 and 14.3; 9.5 and 115; 13.3 and 68.

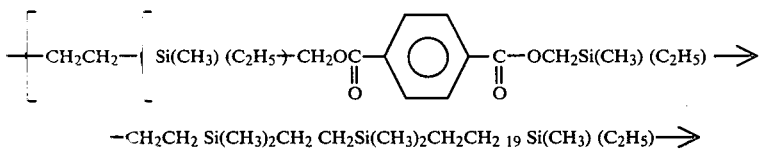

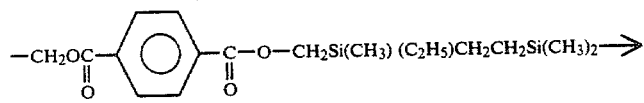

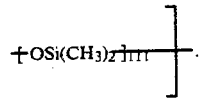

By way of specific examples of units corresponding to the formula F′₁, there are mentioned those of the formula:

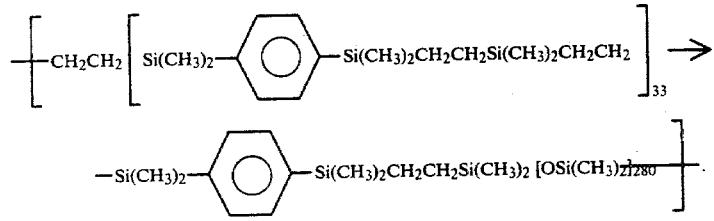

This formula is derived from the formula F′₁ in which the symbols a represent zero.

By way of specific examples of units simultaneously corresponding to the formula A₁ and to the formula F′₁ [the symbols G being restricted to the meanings of G′ but not being identical to G′], there are mentioned those of the formulae:

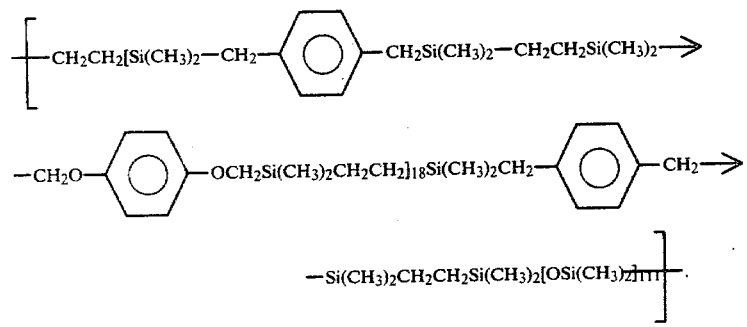

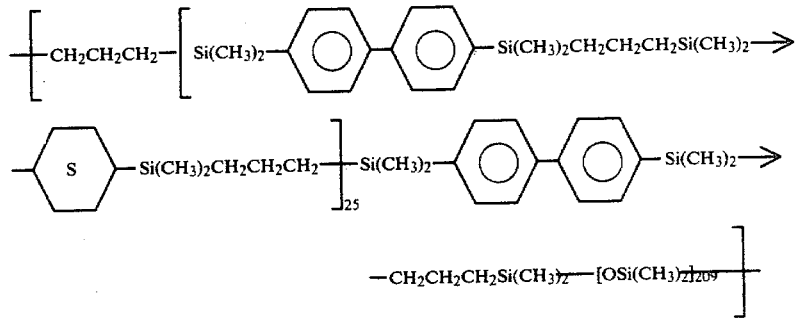

and

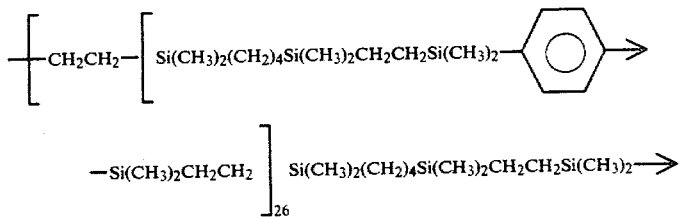

-continued

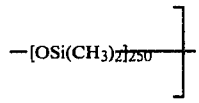

By way of specific examples of units corresponding to the formula F''₁ there are mentioned those of the formulae:

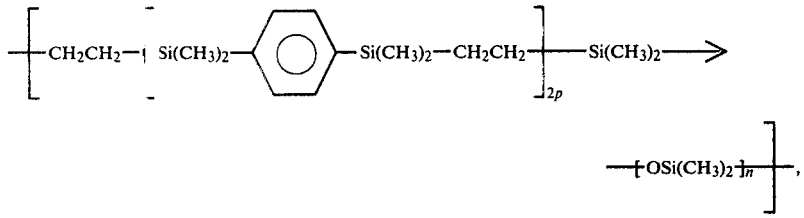

p and n, in pairs = 12 and 111; 6.95 and 125,

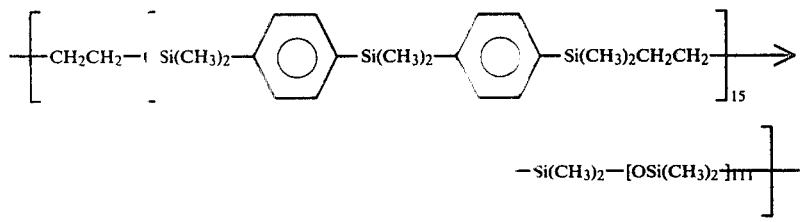

and

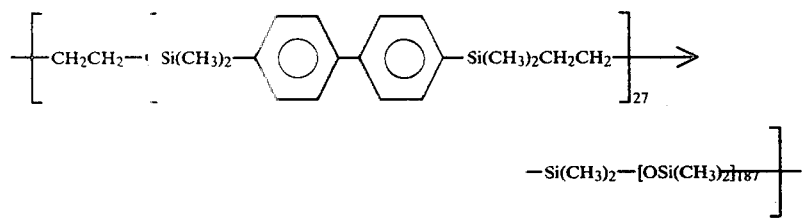

The present invention also relates to non-elastomeric crystalline copolymers which are used as intermediates in the preparation of the block copolymers having units $F_1$ and/or $F'_1$.

They correspond to the formula $F_i$:

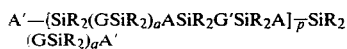

or the formula $F_h$:

in which formulae the symbols A, R, G, G', a and p have the meaning of the symbols included in the formulae $F_1$ and $F'_1$. In addition, the symbols A', which are identical, represent monovalent hydrocarbon radicals which have from 2 to 6 carbon atoms and each contain an ethylenic bond; they become the same as the symbols A by saturation of their ethylenic bond with SiH groups.

More specifically, the symbols A' represent linear or branched chain alkenyl radicals and cyclohexenyl radicals. The symbols A' preferably represent vinyl and allyl radicals.

When the symbols a represent 1 and the symbols G are identical to G' in the formulae $F_i$ and $F_h$, the two formulae can be written, respectively, as:

[formula referred to as $F'_i$ hereafter] and

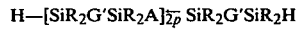

[formula referred to as $F'_h$ hereafter].

By way of specific examples of copolymers corresponding to the formula $F_i$, there are mentioned those of the formulae:

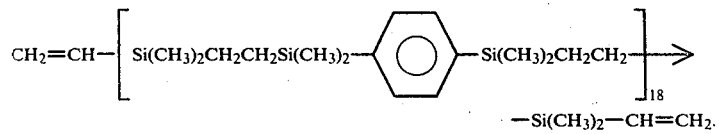

This formula is derived from the formula $F_i$ in which the symbol a represents zero.

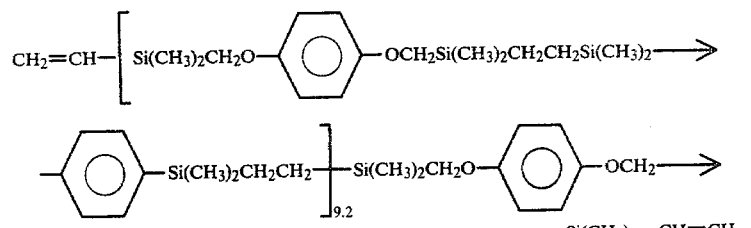
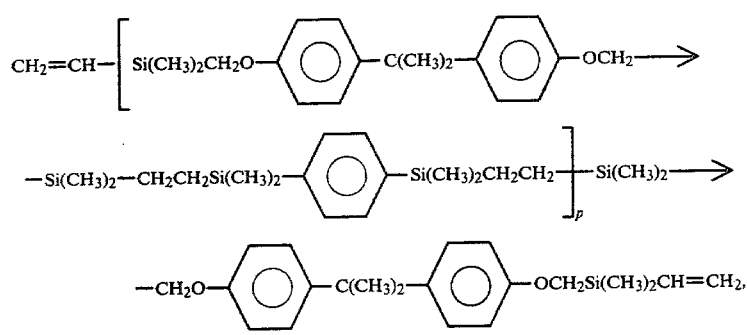
p = 2,3,7,9.5 and 13.3
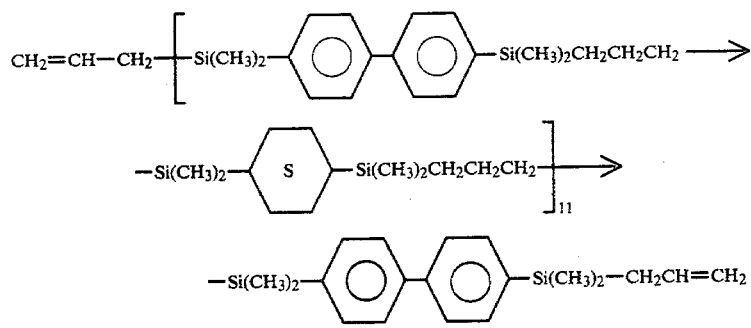
and
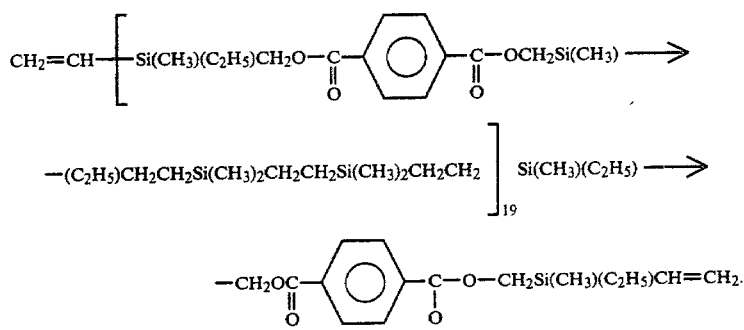
By way of specific examples of copolymers corresponding to the formula F'$_i$, there are mentioned those of the formulae:
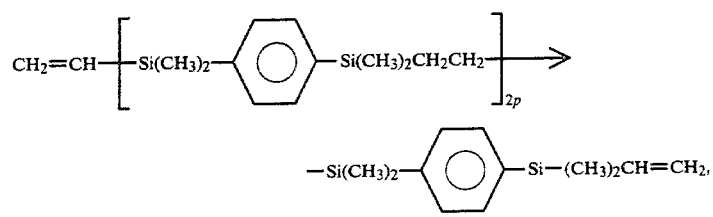
p = 11.5 and 6.45, and -continued

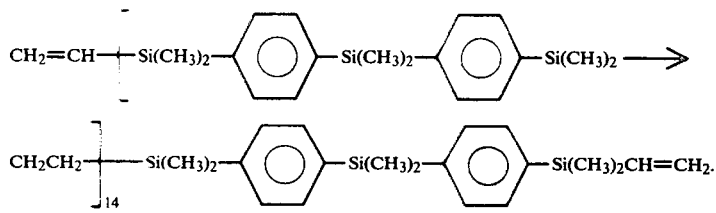

By way of specific examples of units corresponding to the formula $F_h$, there are mentioned those of the formulae:

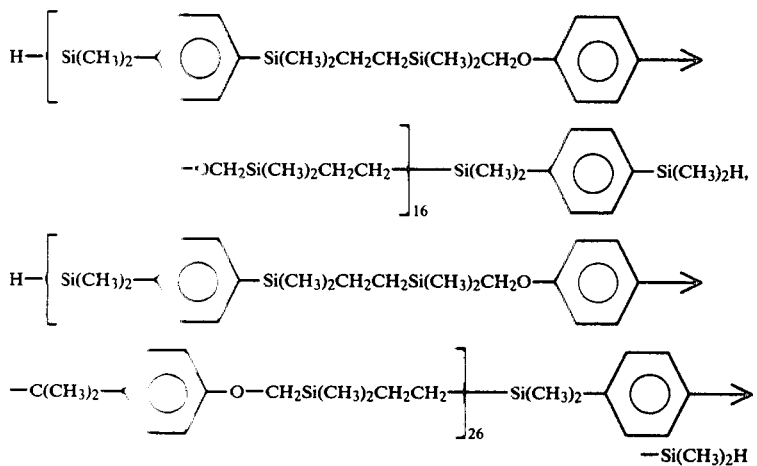

and

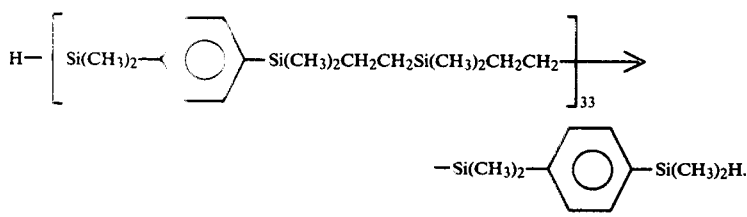

This formula is derived from the formula $F_h$ in which the symbol a represents zero.

By way of specific examples of units corresponding to the formula $F'_h$, there are mentioned those of the formulae:

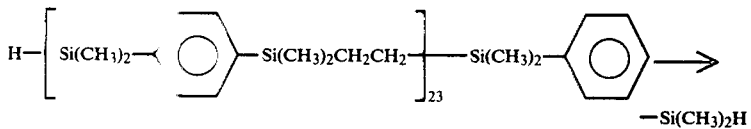

and

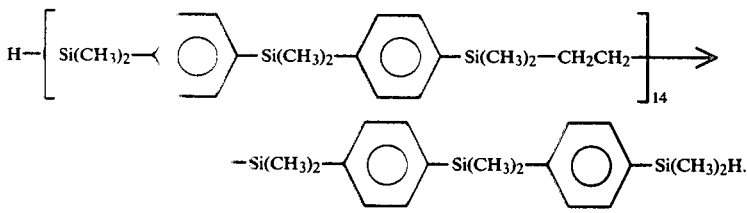

The non-elastomeric crystalline copolymers of the formula $F_l$ or $F_h$ will hereafter be referred to as the "crystallizable blocks".

The thermoplastic, crystalline block copolymers having elastomeric properties according to the invention, can be prepared in accordance with two different processes, each process being carried out in two stages:

Process I: In accordance with this process, the block copolymers prepared consist of units corresponding more especially to the formula $F_1$:

1st stage: In the first stage, the crystallizable block of the formula $F_i$:

$$A'[SiR_2(GSiR_2)_aASiR_2G'SiR_2A]_pSiR_2(GSiR_2)_aA'$$

is prepared by polyaddition, with the aid of a suitable catalyst of p+1 units of the diethylenic silicon compound of the formula $F_4$:

$$A'SiR_2(GSiR_2)_aA'$$

and p units of the dihydrogenated silicon compound of the formula $F_5$:

$$HSiR_2G'SiR_2H.$$

In accordance with a variant of this stage, the particular crystallizable block of the formula $F'_i$:
$$A'—[SiR_2G'SiR_2A]_{2p}SiR_2G'SiR_2A'$$

can be obtained not only by the above mentioned technique [G then being taken to be identical to G' and a representing 1 in the formula $F_4$], but also by polyaddition of the hydrogenomonoethylenic silicon compound of the formula $F_6$:

$$A'SiR_2G'SiR_2H$$

to itself 2p times, using a unit of the compound of the formula $F'_4$:

$$A'SiR_2G'SiR_2A'$$

as the blocking element.
2nd stage: In this stage, at least one unit of the crystallizable block of the formula $F_i$ is reacted, in the presence of a suitable catalyst, with at least one unit of a α,ω-dihydrogenopolydiorganosiloxane of the formula $F_7$:

$$HSiR_2(OSiR_2)_nH.$$

The block copolymer thus formed consists of recurring units corresponding to the said formula $F_1$.

Likewise, at least one unit of the crytallizable block of the formula $F'_i$ is reacted with at least one unit of the dihydrogenodiorganopolysiloxane of the formula $F_7$, and this addition reaction leads to the block copolymer formed from recurring units corresponding to the formula $F'''_1$:

$$+A—[SiR_2G'SiR_2A]_{\overline{2p}}SiR_2G'SiR_2ASiR_2(OSiR_2)_{\overline{n}}+$$

As above indicated, this formula corresponds to the formulae $F_1$ and $F'_1$ in which G is selected to be identical to G' and a represents 1.
Process II: In accordance with this process, the block copolymers prepared consist of units corresponding more especially to the formula $F''_1$:

$$+A+SiR_2G'SiR_2ASiR_2(GSiR_2)_aA\}_{\overline{p}}SiR_2G'SiR_2ASiR_2(OSiR_2)_{\overline{n}}+$$

1st stage: In the first stage, the crystallizable block of the formula $F_h$:

$$H—[SiR_2G'SiR_2ASiR_2(GSiR_2)_aA]—_pSiR_2G'SiR_2H.$$

is prepared by polyaddition, with the aid of a suitable catalyst, of p+1 units of the dihydrogenated silicon compound of the formula $F_5$:

$$HSiR_2—G'—SiR_2H$$

and p units of the diethylenic silicon compound of the formula $F_4$:

$$A'SiR_2(GSiR_2)_aA'.$$

In accordance with a variant of this stage, the particular crystallizable block of the formula $F'_h$:

$$H(SiR_2G'SiR_2A)_{2p}SiR_2G'SiR_2H$$

can be obtained not only by the abovementioned technique [G then being chosen to be identical to G' and a representing 1 in the formula $F_4$], but also by polyaddition of the hydrogenomonoethylenic silicon compound of the formula $F_6$:

$$A'SiR_2G'SiR_2H$$

to itself 2p times, using a unit of the compound of the formula $F_5$ as the blocking element.
2nd stage: In this stage, at least one unit of the crystallizable block of the formula $F_h$ is reacted, in the presence of a suitable catalyst, with at least one unit of an α,ω-diethylenic polydiorganosiloxane of the formula $F_9$:

$$A'SiR_2(OSiR_2)_nA'$$

The block copolymer thus formed consists of recurring units corresponding to the said formula $F''_1$.

Likewise, at least one unit of the crystallizable block of the formula $F'_h$ is reacted with at least one unit of the α,ω-diethylenic polydiorganosiloxane of the formula $F_8$, and this addition reaction leads to the block copolymer formed from recurring units corresponding to the formula $F'''_1$.
Operating conditions for the two types of process:

Process I

1st stage: As a result of the polyaddition indicated above, the amounts of the two compounds $F_4$ and $F_5$ present are selected such as to establish a ratio of molar amount of $F_4$/molar amount of $F_5$ which is equal to (p+1/p). Likewise, the ratio of molar amount of $F_6$/molar amount of $F'_4$ should be equal to 2p/1.

The appropriate molar excess of $F_4$ relative to $F_5$ makes it possible to obtain a crystallizable block $F_i$ which is blocked at the end of the chains by ethylenically unsaturated A' groups. In addition, the introduction of a blocking element $F'_4$ during the polyaddition of $F_6$ makes it possible to obtain a crystallizable block $F'_i$ which is also blocked at the end of the chains by A' groups.

The polyaddition of $F_4$ with $F_5$ or the polyaddition of the compound $F_6$ with itself can take place under the conventional conditions for hydrosilylation.

In particular, the reaction is catalyzed by metals of Group VIII of the Periodic Table of the elements, or by inorganic or organic derivatives thereof; among these metals, there are mentioned, in particular, platinum, palladium, ruthenium, rhodium and iridium.

It is recommended to use platinum which can be introduced in the form of elementary platinum deposited on various supports [alumina, silica or carbon black] or, preferably, in the form of its chlorides. In addition, the platinum chlorides can be modified beforehand by bringing same into contact with specific organic compounds. For example, there are mentioned, on the one hand, the products resulting from the reaction of chloroplatinic acid with alcohols, ethers or aldehydes [U.S. Pat. No. 3,220,972], and, on the other hand, the complexes formed between platinous chlorides and olefins [U.S. Pat. No. 3,159,601] or phosphines or alkyl sulfides.

The amounts of these catalysts introduced are small and normally of the order of 5 to 50 parts by weight, based on the metal, per million parts by weight of the organosilicic reagents employed. These amounts can obviously be larger, but this very frequently brings about only negligible improvements, except for the fact that it reduces the reaction time in the case of very sluggish reactions.

The hydrosilylation reaction can be carried out in the absence of diluents or in a diluent medium; it is preferable to carry out the reaction in a diluent medium, in order to be in a better position to control the reaction and to avoid premature solidification and precipitation of polymers.

The diluents used can be selected from among: aliphatic and cycloaliphatic hydrocarbons which may or may not be halogenated, such as pentane, hexane, heptane, chloroform, dichloroethane, tetrachloroethane, trichloroethylene, perchloroethylene, methylene chloride, cyclohexane, methylcyclohexane and decalin, aromatic hydrocarbons which may or may not be halogenated, such as toluene, xylene, tetralin, chlorobenzene and ortho-dichlorobenzene, and aliphatic esters of monocarboxylic acids, such as ethyl, butyl and amyl acetates.

The amounts to be used and the nature of the diluents can vary; in fact, they depend on various factors such as the reactivity of the starting materials and their degree of solubility, and the increase in the viscosity of the reaction medium during the hydrosilylation reaction. However, it is advantageous to carry out the reaction with dilutions containing from 20 to 90% by weight of diluents.

The reaction temperature can vary over wide limits, depending on the method of operation adopted [whether or not diluents are used, carrying out the reaction at a pressure which is less than, equal to or greater than atmospheric pressure, and the nature of the catalyst]. Temperatures in the range of 40° to 220° C. are preferably used.

The reaction time can also vary [since it depends on the parameters mentioned above] and is determined by taking samples which establish the disappearance of the reactive SiH and Si—A' bonds. This time generally ranges from 10 minutes to 2 hours.

When the crystallizable block $F_i$ or $F'_i$ has formed in a reaction medium which is free from diluents, it can be used as obtained, or also purified by customary means [grinding and washing].

On the other hand, when the crystallizable block has formed in a reaction medium containing diluents, it can be separated off by precipitation [unless it is insoluble in this medium]. For this purpose, one or more diluents in which the block is insoluble or sparingly soluble [for example methanol, ethanol and n-propanol] are added to the reaction medium; the block precipitates as fine particles which can then be filtered off, washed and dried.

According to a preferred embodiment of the process according to the invention [which embodiment can be applied only when the crystallizable block has formed in a homogeneous reaction medium containing one or more diluents], the block is not isolated and the second stage, which relates to the polyaddition of the block with the dihydrogenopolydiorganosiloxane, takes place in this homogeneous reaction medium.

The crystallizable blocks $F_i$ and $F'_i$ are hard crystalline solids having melting points which range from 40° to 280° C. They have molecular weights which can vary, depending on the degree of polyaddition p.

However, the number-average molecular weights preferably range from 1,000 to 20,000.

2nd stage: The amounts of the crystallizable block $F_i$ or $F'_i$ and the dihydrogenodiorganopolysiloxane $F_7$ present are determined by the values employed for the ratio of number of ethylenic groups A' in $F_i$ or $F'_i$/number of SiH groups in $F_7$.

This ratio can range from 0.7/1 to 1.3/1. However, it is recommended to select same from within a narrower range of values, so as to obtain block copolymers having high molecular weights. For this purpose, a ratio ranging from 0.9/1 to 1.1/1 is preferably used.

The copolymers having recurring units of the formulae $F_1$ and $F'_1$ should theoretically be terminated at each end of their chain by SiH and/or SiA' groups.

Nevertheless, it is possible to have other blocking groups by adding, during the addition reaction of $F_i$ or $F'_i$ with $F_7$, organosilicic compounds having a single SiH group, such as trimethylvinylsilane or styrene.

The reaction of $F_i$ or $F'_i$ with $F_7$ is catalyzed by the catalytic agents described in the first stage; the amounts introduced are essentially the same, namely, of the order of 5 to 50 parts by weight, based on the metal, per million parts by weight of the organosilicic reagents employed.

This reaction can also be carried out in a medium which may or may not contain diluents. The presence of diluents is preferred for the reasons already mentioned in the first stage [to control the reaction and avoid the premature solidification and precipitation of polymers].

The diluents are identical to those listed in the first stage. In addition, the amounts employed can vary, depending on various factors such as the degree of solubility of the reagents employed and of the block copolymers generated, and the viscosity of the reaction medium.

However, it is preferably to carry out the reaction with dilutions containing from 30 to 95% by weight of diluents. [As indicated in the first stage, it is recommended to introduce the dihydrogenopolydiorganosiloxane $F_7$ directly into the homogeneous reaction medium, containing diluents, in which the crystallizable block $F_i$ or $F'_i$ has formed, without separation of the latter.]. This variant simplifies the course of both stages because it avoids the separation of the crystallizable block in the first stage and the addition of diluents and catalysts in the second stage. However, it is sometimes necessary to complement the amounts of diluents and catalysts used in the first stage with additional amounts which are sufficient to obtain, in this second stage, a medium which is homogeneous and reactive throughout the polyaddition reaction. These additional amounts are obviously much less than those envisaged for the reaction of $F_i$ or $F'_i$ with $F_7$.

As regards the reaction time, it is governed by the same factors as those mentioned in the first stage; nevertheless, the hydrosilylation reaction of $F_i$ or $F'_i$ with $F_7$ is concerned with compounds of higher molecular weight; it is therefore natural to use a slightly different temperature range which is preferably between 60° C. and 250° C.

The reaction time is a function of the reactivity of $F_i$ or $F'_i$ and $F_7$ and of the reaction temperature. It is determined by taking samples which establish the disappearance of the reactive SiH and SiA' groups; this time can be between 30 minutes and about ten hours.

Process II

1st stage: The course of this stage is very similar to the course of the first stage of process I.

The amounts of the two compounds $F_5$ and $F_4$ present are selected such as to establish a ratio of molar amount of $F_5$/molar amount of $F_4$ which is equal to $(p+1/p)$; likewise, the ratio of molar amount of $F_6$/molar amount of $F_5$ should be equal to $2p/1$.

The appropriate molar excess of $F_5$ relative to $F_4$ makes it possible to obtain a crystallizable block $F_h$ which is blocked at the end of the chains by SiH groups; furthermore, the introduction of the blocking element $F_5$ during the polyaddition of $F_6$ makes it possible to obtain a crystallizable block $F'_h$ which is also blocked at the end of the chains by SiH groups.

These polyadditions can be carried out under the conditions of the hydrosilylation reaction which were mentioned in the first stage or process I: the use of catalytic agents such as platinum and its organic or inorganic derivatives, the preferred use of diluents and the use of diluted mixtures containing from 20 to 90% by weight of diluents, a reaction temperature ranging from 40° C. to 220° C., and a reaction time ranging from 10 minutes to 2 hours.

The crystallizable blocks $F_h$ and $F'_h$ generated can be separated from their reaction medium in accordance with the techniques described in the first stage of process I.

In the case where the polyaddition reaction takes place in a reaction medium containing diluents, it is also possible not to separate off the blocks $F_h$ or $F'_h$ and to continue the second stage in this reaction medium.

The blocks $F_h$ and $F'_h$ are crystalline solids which have melting points ranging from about 40° C. to 250° C., and number-average molecular weights which are preferably in the range of 1,000 to 20,000.

2nd stage: The course of this stage is similar to that described in the second stage of process I.

The amounts of the crystallizable block $F_h$ or $F'_h$ and the α,ω-diethylenic polydiorganosiloxane $F_8$ present are determined by the values employed for the ratio number of ethylenic groups A' in $F_8$/number of SiH groups $F_h$ or $F'_h$; this ratio can range from 0.7/1 to 1.3/1 and is preferably from 0.9/1 to 1.1/1.

The copolymers having recurring units $F'_1$ and $F'''_1$ should theoretically be blocked at the end of their chain by SiH and/or SiA' groups.

In order to have other blocking groups, it is necessary to introduce, during the polyaddition reaction of $F_h$ or $F'_h$ with $F_8$, for example, organosilicic compounds or organic compounds of the type mentioned in the second stage of process I [trimethylhydrogenosilane, trimethylvinylsilane and styrene].

Furthermore, the conditions of the hydrosilylation reaction are also those of the second stage of process I; the introduction of the same catalysts and diluents at the same concentrations, the use of the same reaction temperatures and times and the possibility of introducing the α,ω-diethylenic polydiorganosiloxane $F_8$ directly into the reaction medium of the first stage [which medium contains one or more diluents and the crystallizable block $F_h$ or $F'_h$].

The methods of operation described above, which relate to processes I and II, show that the production of the crystallizable blocks [1st stage] is carried out before the introduction of the diorganopolysiloxanes in the second stage.

However, the preparation of the block copolymers in a single stage is not excluded; it can take place by simply heating mixtures consisting of the reagents $F_4$, $F_5$ and $F_7$ or $F_8$.

A polyaddition of this type can be carried out in a medium which may or may not be a diluent medium, at temperatures ranging from 80° to 260° C. for periods of time ranging from 1 hour to 30 hours. The resulting copolymers are sometimes difficult to purify; thus, they do not always possess exactly the same properties as those copolymers obtained by the two-stage process. Separation of the block copolymers having units $F_1$, $F'_1$ and $F''_1$ Whether same are obtained in accordance with process I or II or the single-stage process, these copolymers are separated, from the reaction media in which they are formed, by known techniques which are analogous to those employed for the separation of the crystallizable blocks $F_i$, $F'_i$, $F_h$ and $F'_h$.

Thus, in the case of the production of homogeneous reaction mixtures containing diluents, the copolymers can be precipitated by adding other diluents in which they are insoluble or sparingly soluble; they are then washed and dried.

However, the copolymers can be used in the form of homogeneous reaction mixtures for the formation of films by depositing the mixtures as thin layers onto various non-stick [release] supports, deposition being followed by evaporation of the diluents.

In the case of the production of reaction mixtures containing the block copolymers in suspension, the latter can be separated from the diluents by filtration or, alternatively, by removal of volatile materials under a pressure below atmospheric pressure, and they are then preferably washed and dried. If the reaction mixtures do not contain diluents, they virtually consist only of the copolymers; the latter can then be used in the crude state or purified by dissolution and precipitation.

Regardless of the method of treatment used, the block copolymers are solid substances which have the properties of elastomers but possess melting points in the range of 60° to 250° C.; they are therefore thermoplastic elastomers. Their proportion of crystalline regions depends on the mechanical and thermal stresses to which they have previously been subjected. They have a variable crystallization rate due to the nature of the structural linkages which constitute their component units.

When this crystallization rate is slow, it is preferable, after they have been molded by melting and applying pressure, to keep them at the appropriate temperature, for formation of the crystalline regions, for a period of time ranging from 1 hour to 48 hours. After this heat treatment, the copolymers possess their optimum mechanical properties.

When their crystallization rate is rapid, it is not necessary to subject them to a heat treatment; on cooling after melting, the copolymers rapidly reach their maximum degree of crystallinity.

The range of the values of the mechanical properties of these copolymers is very broad; it is a function of the constitution of their units and of the percentage by weight of blocks of the formula $-SiR_2(OSiR_2)_n-$ which these units contain.

This percentage can vary very widely; however, it is recommended to produce copolymers which contain from 10 to 80% of their weight of diorganopolysiloxane blocks $-SiR_2(OSiR_2)_n-$.

When this percentage is low, the copolymers have high mechanical properties similar to those of purely organic block copolymers. On the other hand, when this percentage is high, the copolymers have lower mechanical properties which are nevertheless superior to those of the customary organopolysiloxane elastomers.

These copolymers are characterized mainly by their ability to withstand high thermal stresses. In fact, their modulus of elasticity does not vary greatly over a temperature range extending from ambient temperature to temperatures as high as 160° C.

They can therefore withstand a superheated environment, which is found, for example, in ovens, furnaces and heat exchangers, without losing any of their dimensional stability.

They can additionally be converted into gaskets, profiles, insulating and protective coverings, and solid fibers, employing the techniques used by rubber manufacturers of those used by plastics processors. Articles of this kind can be used in numerous industrial fields [such as the motor car, marine, aviation, electrotechnical and textile industries].

Furthermore, because they contain diorganopolysiloxane blocks, these copolymers have a good permeability to gases.

They can thus be converted into hollow fibers which can be used in the preparation of exchangers of the gas/gas and gas/liquid type, or into membranes having selective permeability, which can be used, inter alia, as artificial lungs or as elements for separating gases in devices intended for modifying the proportion of at least one of the constituents of gaseous mixtures such as air.

In order to improve the mechanical properties of the copolymers and also their resistance to solvents, there may be incorporated therein, at the rate of at most 100% of their weight, customary pulverulent fillers selected from amongst pyrogenic silica and silica produced by precipitation, diatomaceous silicas, ground quartz, calcined clays, iron, titanium, magnesium and zinc oxides, carbon blacks, graphite, alkali metal and alkaline earth metal carbonates and magnesium, aluminum and zirconium silicates.

Preparation and description of the monomers $F_4$, $F'_4$, $F_5$ and $F_6$ and of the polymers $F_7$ and $F_8$ 1. Monomers of the formula $F_4$; $A'SiR_2(GSiR_2)_aA'$ and $F'_4$; $A'SiR_2G'SiR_2A'$.

These monomers can be synthesized using the conventional reactions of organic and organosilicon chemistry.

Two cases must be distinguished, depending on the meaning of the symbol a.

(1) a=0

This case applies only to the monomers $F_4$ which are then represented by the formula $A'SiR_2AA'SiR_2A'$.

Monomers of this kind can be prepared by condensing the magnesium compound of a halide of the radical A', such as ClA', with an organochlorosilane $R_2SiCl_2$, in accordance with the following equation:

$$R_2SiCl_2 + 2Cl\text{-}MgA' \rightarrow A'SiR_2A' + 2MgCl_2.$$

Compounds of this type which are mentioned by way of illustration are those of the formulae:

$$CH_2=CHSi(CH_3)_2CH=CH_2,$$

$$CH_2=CHCH_2Si(CH_3)_2-CH=CH_2,$$

$$CH_2=CHSi(CH_3)(C_2H_5)CH=CH_2,$$

$$CH_2=CHSi(CH_3)(n\text{-}C_3H_7)CH=CH_2, \text{ and}$$

$$CH_2=CHSi(CH_3)(C_6H_5)CH=CH_2.$$

(2) a=1

The monomers $F_4$ are represented by the formula $A'SiR_2GSiR_2A'$ and the monomers $F'_4$ retain their formula $A'SiR_2G'SiR_2A'$.

(i) G and G' represent linear or branched chain alkylene radicals having from 1 to 8 carbon atoms.

The monomers $F_4$ and $F'_4$ can be prepared from starting materials of the formula $ClSiR_2G_1SiR_2Cl$ [$G_1$ representing alkylene radicals], in which the SiCl groups are then converted into SiA' groups by reaction with the magnesium compound of a halide of the radical A'.

They can additionally be prepared by a slightly different route defined by the following equation:

$$A'SiR_2Cl + ClMgG_1SiR_2A' \rightarrow A'SiR_2G_1SiR_2A' + MgCl_2$$

Compounds of this type which are mentioned by way of illustration are those of the formulae:

$$CH_2=CHSi(CH_3)_2(CH_2)_uSi(CH_3)_2CH=CH_2,$$

u=1 to 8 and $$CH_2=CHSi(CH_3)(C_6H_5)CH_2CH_2Si(CH_3)(C_6H_5)CH=CH_2.$$

(2i) G [but not G'] represents divalent organic radicals corresponding to formula $F_2$: $-(CH_2)_xQTQ(CH_2)_x-$.

The monomers can be prepared in a single stage by condensing 2 units of the silane of the formula $A'SiR_2(CH_2)_xCl$ with one unit of the compound of the formula $-MQTQM-$ (M representing Na, K, or $NH_4$, and Q representing one of the groups O and $-OCO-$).

The equation for the condensation is as follows:

$$2A'SiR_2(CH_2)_xCl + MQTQM \rightarrow A'\text{-}SiR_2(CH_2)_xQTQ(CH_2)_xSiR_2A' + 2MCl.$$

According to another method of preparation, which is similar to the above and can be used only when Q represents $-OCO-$, two units of the compound $A'-SiR_2(CH_2)_xCl$ can be condensed with one unit of the compund $-HOCOTCOOH-$, in the presence of a tertiary amine, such as triethylamine, which scavenges the two units of HCl generated during the reaction.

By way of illustration of monomers prepared according to the above processes, there are mentioned those of the formulae:

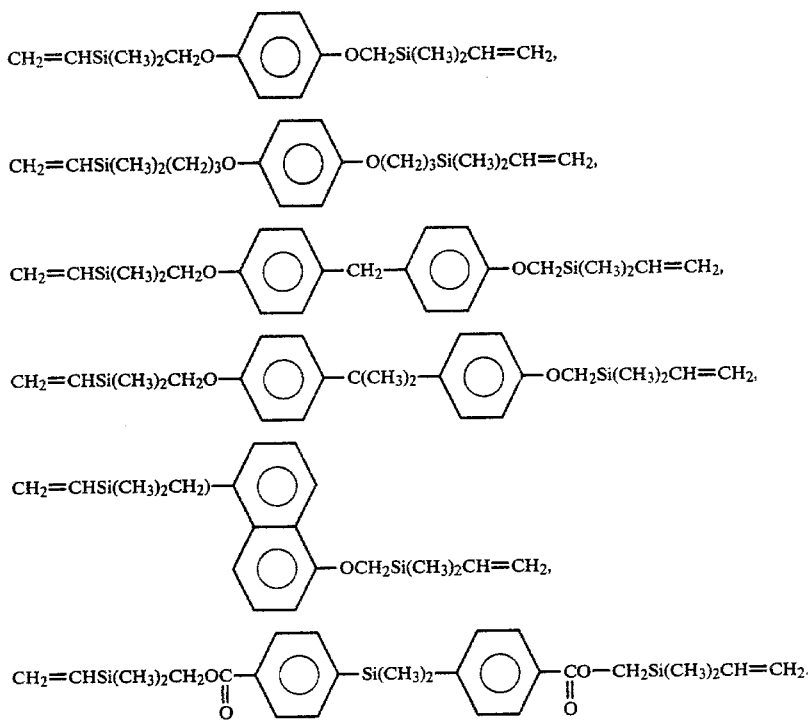

(3i) G and G′ represent divalent hydrocarbon radicals corresponding to the formula F₃: —(CH₂)$_b$T(CH₂)$_b$—.

Two cases must be distinguished, depending on the meaning of the symbol b:

b=0

The monomers correspond to the formula A′SiR₂T-SiR₂A′.

They can be prepared by a 2-stage magnesium synthesis.

In the first step, the monomagnesium compound of the dihalogenated derivative of T, in particular the dichlorinated derivative, is condensed with the chlorosilane A′SiR₂Cl in accordance with the equation: A′-SiR₂Cl+ClMgTCl→A′SiR₂TCl+MgCl₂.

In the 2nd stage [which can take place in the reaction medium of the first stage, without prior separation of A′SiR₂TCl] the magnesium compound of A′SiR₂TCl is prepared and then condensed with another unit of the chlorosilane A′SiR₂Cl in accordance with the equation:

A′SiR₂TMgCl+ClSiR₂A′→A′SiR₂TSiR-2A′+MgCl₂.

Furthermore, when the symbol T represents a linkage consisting of two hydrocarbon rings joined together by the group SiR′₂, a further possibility of magnesium synthesis exists and is represented by the following scheme

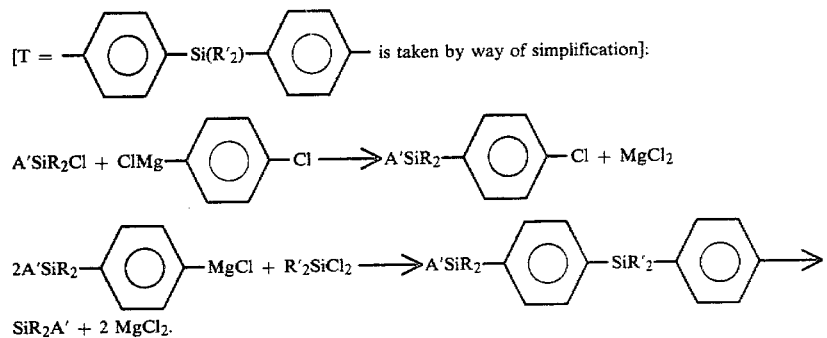

By way of illustration of monomers prepared in accordance with the above-mentioned processes, there are mentioned those of the formulae:

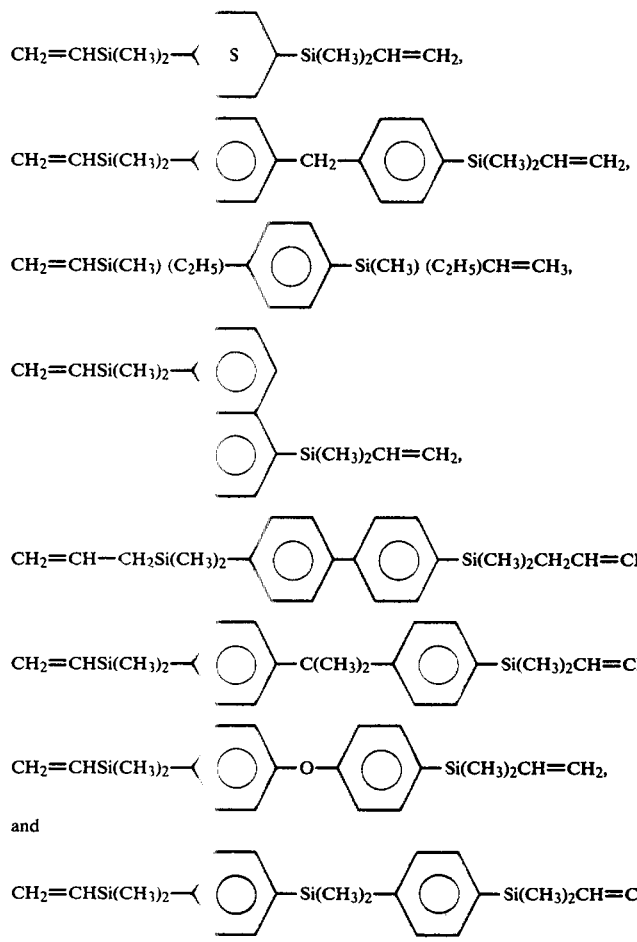

The monomers correspond to the formula:

A'SiR₂CH₂TCH₂SiR₂A'.

They can be prepared by magnesium synthesis in accordance with the following equation:

2A'SiR₂Cl + ClMgCH₂TCH₂MgCl → A'-SiR₂CH₂TCH₂SiR₂A' + 2MgCl₂.

By way of illustration of monomers of this type, there are mentioned those of the formulae:

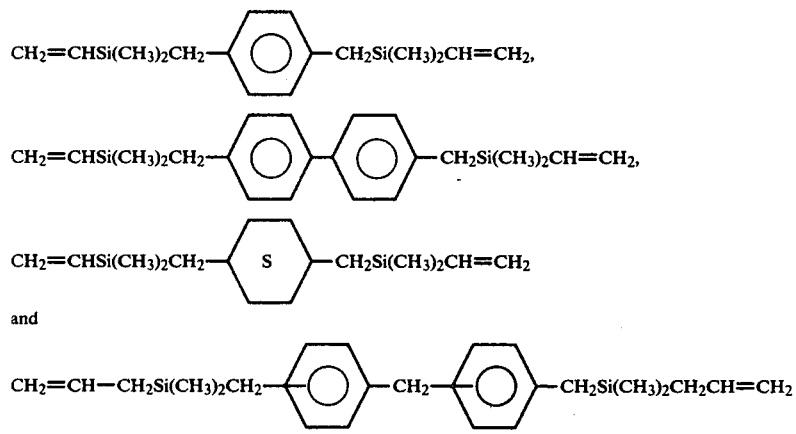

and

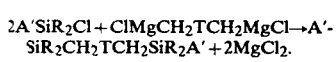

II. Monomers of the formula F₅: HSiR₂G'SiR₂H

As already indicated, the symbol G' represents a linear or branched chain alkylene group having from 1 to 8 carbon atoms, or a linkage of the formula F₃: —(CH₂)ᵦT(CH₂)ᵦ.

These monomers can be prepared by the following processes which are similar to those described for the preparation of the monomers F'$_4$.

(1) The symbol G' represents a linear or branched chain alkylene group having from 1 to 8 carbon atoms.

The monomers can be prepared from disilylalkanes of the formula ClSiR$_2$G'SiR$_2$Cl, in which the SiCl groups are then reduced to SiH groups by the action of an alkali metal hydride or of a mixed hydride such as lithium aluminum hydride.

They can additionally be prepared by magnesium synthesis in accordance with the equation: HSiR$_2$Cl+ClMgG'SiR$_2$H→HSiR$_2$G'SiR$_2$H+MgCl$_2$.

By way of illustration of monomers obtained in accordance with these processes, there are mentioned those of the formulae:

HSi(CH$_3$)$_2$(CH$_2$)$_v$Si(CH$_3$)$_2$H, v=1 to 8, and

HSi(CH$_3$)(C$_6$H$_5$)CH$_2$Si(CH$_3$)(C$_6$H$_5$)H.

(2) The symbol G' corresponds to the formula F$_3$:

$+CH_2)_bT(CH_2+)_b$.

There are two cases:

b=0

The monomers correspond to the formula HSiR$_2$TSiR$_2$H.

Same can be prepared in accordance with the processes described in the earlier paragraph I (3i) relating to the preparation of the monomers F$_4$ and F'$_4$ having the particular formula A'SiR$_2$TSiR$_2$A'.

The reaction schemes are identical; it suffices to replace the SiA' group by SiH groups.

By way of illustration of monomers of this type, there are mentioned those of the formulae:

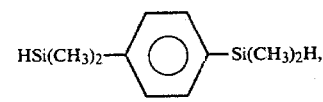

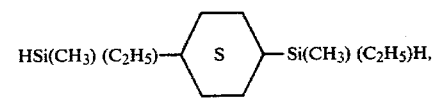

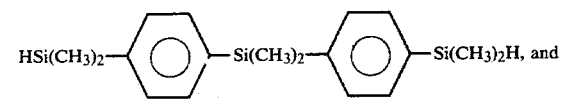

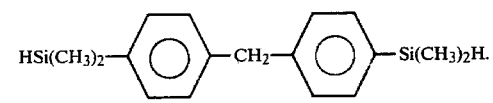

b = 1

The monomers correspond to the formula HSiR$_2$CH$_2$TCH$_2$SiR$_2$H. The method of operation is identical to that described in the earlier paragraph I (3i) relating to the preparation of the monomers F$_4$ and F'$_4$ having the particular formula A'SiR$_2$CH$_2$TCH$_2$SiR$_2$A'.

In this case again, it suffices to replace the SiA' groups by SiH groups in the reaction scheme in this paragraph.

By way of illustration of monomers of this type, there are mentioned those of the formulae:

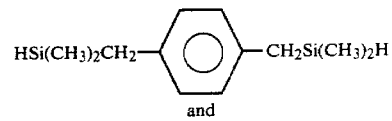

and

III. Monomers of the formula F$_6$: A'SiR$_2$G'SiR$_2$H

Their preparation essentially follows the processes employed for preparing the above monomers of the formula F$_5$; thus, several cases are to be considered, depending on the meaning of G'.

(1) The symbol G' represents a linear or branched chain alkylene group having from 1 to 8 carbon atoms.

The monomers can be prepared from disilylalkanes of the formula A'SiR$_2$G'SiR$_2$Cl in which the SiCl groups are then reduced to SiH groups, also with alkali metal hydrides or lithium aluminum hydride.

They can additionally be prepared by magnesium synthesis, the reaction being carried out in accordance with the equation below:

HSiR$_2$Cl+ClMgG'SiR$_2$A'→HSiR$_2$G'SiR$_2$A'+MgCl$_2$

By way of illustration of monomers of this type, there are mentioned those of the formulae:

HSi(CH$_3$)$_2$(CH$_2$)$_t$Si(CH$_3$)$_2$CH=CH$_2$, t=1 to 8 and

HSi(CH$_3$)(C$_6$H$_5$)CH$_2$CH$_2$Si(CH$_3$)(C$_6$H$_5$)CH=CH$_2$.

(2) The symbol G' corresponds to the formula F$_3$: $+CH_2)_bT(CH_2+)_b$.

Two cases are to be considered, depending on the meaning of the symbol b:

b=0

The monomers correspond to the formula A'SiR$_2$TSiR$_2$H.

Same can be prepared by magnesium synthesis in accordance with the two-stage process given in the earlier paragraph I (3i) relating to the preparation of the monomers F$_4$ and F'$_4$ having the particular formula A'SiR$_2$TSiR$_2$A'.

However, it is obviously necessary to employ equimolar amounts of the silane of the formula A'R$_2$SiCl and the silane of the formula HSiR$_2$Cl. Preferably, the silane A'SiR$_2$TCl is prepared first, its magnesium compound A'SiR$_2$TMgCl is produced and this magnesium compound is condensed with HSiR$_2$Cl.

When the symbol T represents a linkage consisting of two hydrocarbon rings which are joined together by the group SiR'$_2$, it is recommended to carry out the reaction in two separate stages in accordance with the scheme below [the hydrocarbons being represented by p-phenylene rings in order to simplify the rings]:

1st stage:

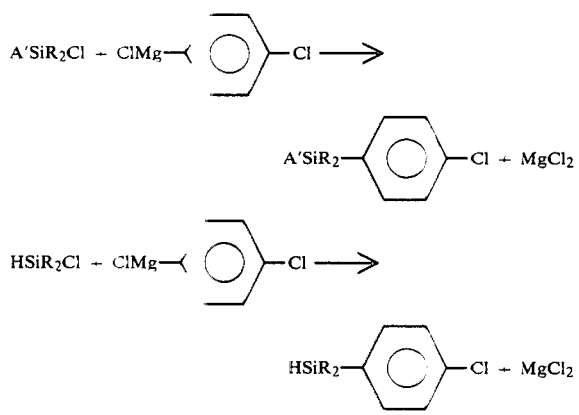

2nd stage:

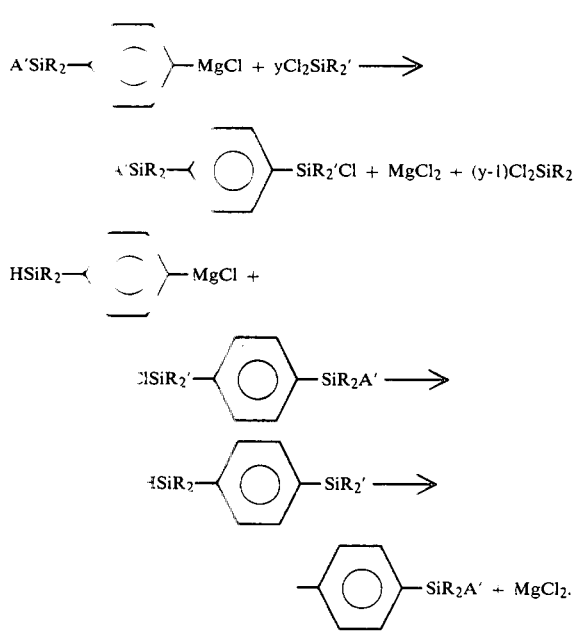

In the 2nd stage, the symbol y represents at least 1.5 and at most 15, and this entails the use of a molar excess of the silane (R')₂SiCl₂. Furthermore, one unit of the magnesium compound

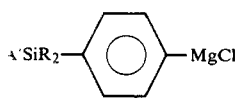

is added gradually to the container in which y units of the silane (R')₂SiCl₂ are present.

By way of illustration of monomers prepared in accordance with these processes, there are mentioned those of the formulae:

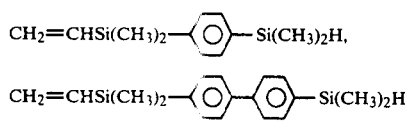

and

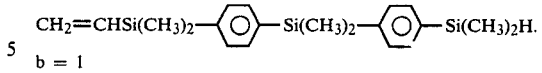

b = 1

The monomers correspond to the formula A'-SiR₂CH₂TCH₂SiR₂H.

The preparation can be carried out in the following manner:

1st stage:

A'SiR₂Cl + ClMgCH₂TCH₂Cl → A'-SiR₂CH₂TCH₂Cl + MgCl₂.

2nd stage:

A'SiR₂CH₂TCH₂MgCl + ClSiR₂H → A'-SiR₂CH₂TCH₂SiR₂H + MgCl₂.

By way of illustration of monomers of this type, there are mentioned those of the formulae:

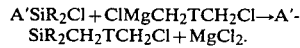

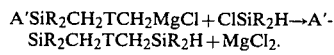

and

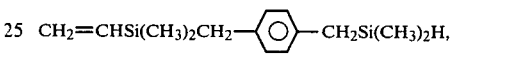

IV. Polymers of the formula F₇: HSiR₂(OSiR₂)ₙH

The dihydrogenopolydiorganosiloxanes of the above-mentioned formula are commercially available silicones; in addition, the techniques for their preparation are now well perfected.

A widely used technique consists, in a first stage, in cohydrolyzing suitable mixtures comprising the chlorosilanes of the formulae R₂SiCl₂ and HR₂SiCl.

In a 2nd stage, the cohydrolysates are heated to a temperature ranging from 50° to 200° C., in the presence of a rearrangement catalyst such as sulfuric acid, or an earth activated by a mineral acid, or a cationic ion exchange resin. During this heating, the siloxane bonds rearrange and the SiOH groups condense. Other techniques can be employed; for example, a monochlorodiorganosilane HSiR₂Cl can be reacted with an α,ω-dihydroxypolydiorganosiloxane H(OSiR₂)ₙ₋₁OH, in the presence of a HCl acceptor, or with a α,ω-dialkoxypolydiorganosiloxane R"(OSiR₂)ₙ₋₁OR" in the presence of ferric chloride (R" representing a methyl, ethyl or n-propyl radical).

Same can also be prepared by the copolymerization and rearrangement of an octaorganocyclotetrasiloxane, such as octamethylcyclotetrasiloxane, with an α,ω-hydrogenodiorganodisiloxane of low molecular weight, such as α,ω-dihydrogenotetramethyldisiloxane.

The molecular weight of the α,ω-dihydrogenopolydiorganosiloxanes F₇ can vary; it is determined by the nature of the substituents R and, in particular, by the value of n, which can range from 1 to 1,500 and is preferably from 10 to 800.

Polymers of the formula F₇ which are mentioned by way of specific examples are those of the formulae:

HSi(CH₃)₂OSi(CH₃)₂H,

HSi(CH₃)₂ [OSi(CH₃)₂]ₙH, n assuming values 14, 37, 68, 111 or 115,

HSi(CH₃)₂ [OSiCH₃(C₂H₅)]₅[OSi(CH₃)₂]₁₅₀H,

HSi(CH₃)₂[OSiCH₃(CH₂CH₂CF₃)]₁₁ [OSi(CH₃)₂]₉₀H,

HSi(CH₃)₂[OSiCH₃(C₆H₅)]₁₆ [OSi(CH₃)₂]₃₁₀H,

HSi(CH₃)₂ [OSi(CH₃)(CH₂CH₂CN)]₁₃ [OSi(CH₃)₂]₁,₁₀₀H, and

HSi(CH₃(C₆H₁₁)) [OSi(CH₃)₂]₁,₂₃₃OSiCH₃(C₆H₁₁)H.

These polymers of the formula F₇ have viscosities which generally range from a few cP at 25° C. to 500,000 cP at 25° C.

V. Polymers of the formula F₈: A'SiR₂(OSiR₂)ₙA'

These polymers are sold commercially by silicone manufacturers; furthermore, the processes for their preparation are easy to reproduce.

A widely employed process consists in polymerizing and rearranging [in the presence of acid or basic catalysts] mixtures of polysiloxanes comprising cyclic polymers of the formula (SiR₂O)$_w$ (w=3, 4, 5, 6 or 7) and linear polymers of the formula A'SiR₂(OSiR₂)$_{w'}$A' (w'=1 to 8).

This technique leads to polymers F₈, in which n is very frequently more than 10.

Other techniques can be used to prepare polymers in which n can be less 10. For example, there may be mentioned the condensation of two units of the silane A'SiR₂Cl with one unit of the hydroxylic diorganopolysiloxane polymer HO(SiR₂O)$_{n-1}$H; this condensation takes place in the presence of a basic agent which accepts HCl.

The molecular weight of the polymers F₈ is determined in the same way as that of the polymers F₇, mainly by the value of n, which can range from 1 to 1,500 and is preferably 10 to 800.

Polymers F₈ which are mentioned by way of specific examples are those of the formulae:

CH₂=CHSi(CH₃)₂OSi(CH₃)₂CH=CH₂

CH₂=CHSi(CH₃)₂—[OSi(CH₃)₂]$_{\overline{n'}}$CH=CH₂, n'=10, 25, 38, 53, 85 or 125, CH₂=CH—CH₂Si(CH₃)₂[OSi(CH₃)₂]₃₅CH₂CH=CH₂ and

CH₂=CHSi(CH₃)₂—[OSiCH₃(CH₂CH₂CF₃)]₁₅[OSi(CH₃)₂]₁₀₅CH=CH₂.

The polymers of the formula F₈ have viscosities which generally range from a few cP at 25° C. to 500,000 cP at 25° C., in the same way as those of the polymers of the formula F₇.

In order to further illustrate the present invention and the advantages thereof, the following specific examples are given, it being understood that same are intended only as illustrative and in nowise limitative.

EXAMPLE 1

I. Preparation of a block polymer consisting of recurring units of the structural formula:

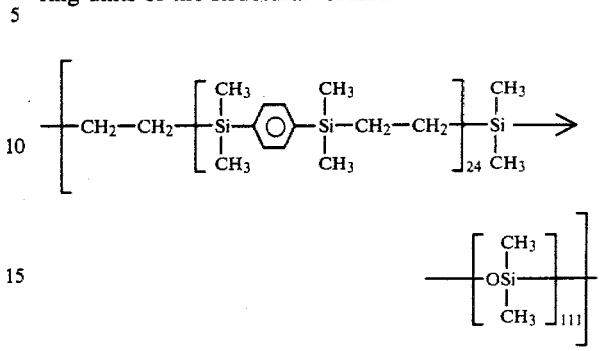

(x) 11.2 g (0.045 mol) of 1,4-bis-(dimethylvinylsilyl)-benzene of the formula:

prepared as indicated below in part III, 8.15 g (0.042 mol) of 1,4-bis-(dimethylsilyl)-benzene of the formula:

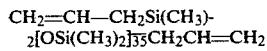

prepared as indicated below in part IV, and 58 g of toluene were introduced into a 250 cm³ glass reactor equipped with a stirring system, a reflux condenser, a thermometer and a nitrogen inlet.

The stirring was started, the nitrogen inlet was opened such that there was introduced a gentle stream of gas and the contents of the reactor were gradually heated to 70° C. When this temperature was reached, the heating was stopped and 0.5 cm³ of a catalyst solution based on chloroplatinic acid, containing 3.3×10⁻⁶ g atoms of platinum/cm³, was added.

This resulted in a temperature increase of about 30° C. The heating was re-established and regulated so as to maintain a gentle reflux of the toluene, and the mixture was heated under these conditions for 1 hour.

(y) 29.01 g of an α,ω-dihydrogenopolydimethylsiloxane having a number-average molecular weight of 8,300, and 55 g of toluene, were added to the contents of the round-bottom flask. 1.5 cm³ of the abovementioned catalyst solution were also added. The mixture was heated under reflux for 5 hours; the solution of the copolymer, which resulted from this heating, was then poured into 500 cm³ of absolute ethanol which was vigorously stirred. This treatment caused the copolymer to precipitate in the form of fine white particles and these particles were subsequently washed with 500 cm³ of absolute ethanol and then dried for 3 hours at about 130°-140° C. under a pressure of 15 mm of mercury. The intrinsic viscosity of the pulverulent copolymer, measured at 20° C. in chloroform, was 0.72 dl/g.

Several batches of the powder were placed in molds where same were heated at 190° C. under a pressure of 50 bars for 5 minutes.

This resulted in the formation of rubbery plates which possessed the following mechanical properties, without having undergone any prior heat treatment: Shore hardness [in accordance with French Standard Specification No. T 51 109]: 88; breaking strength [in accordance with French Standard Specification No. T 46 002]: 140 kg/cm$^2$; elongation at break [in accordance with French Standard Specification No. 46 002]: 570%; tear strength [in accordance with French Standard Specification No. T 46 007]: 30 kg/cm.

These plates possessed a melting zone at about 175°-180° C. The analytical and spectrophotometric methods used for the batches of powders made it possible to assign the formula given above to the units constituting the copolymer.

This copolymer contains approximately 60% by weight

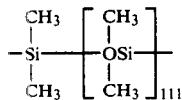

blocks. Despite this high proportion, its modulus of elasticity was still high [as shown by the results below] at temperatures above 150° C.; furthermore, this modulus hardly varied over a wide range of temperatures.

| Temperature in °C. | 20 | 100 | 110 | 120 | 150 | 160 |
|---|---|---|---|---|---|---|
| Modulus of elasticity in kg/cm$^2$ | 2 × 10$^7$ | 7 × 10$^6$ | 7 × 10$^6$ | 6 × 10$^6$ | 5 × 10$^6$ | 3 × 10$^6$ |

II. Separation of the intermediate crystallizable block.

The method of operation described in paragraph (x) under I was repeated and the crystallizable block formed was then separated off in the following manner.

The toluene was evaporated off by gradually heating the reaction mixture to about 120° C.; the pressure used was below atmospheric pressure and stabilized at about 20 mm of mercury, at the completion of the evaporation.

A whitish solid residue remained which was ground and then dried for 1 hour at 100° C. This solid had a melting point of 186° C., a glass transition temperature of about 12° C. and a number-average molecular weight of 5,305.

The analytical and spectrophotometric methods made it possible to assign the structural formula:

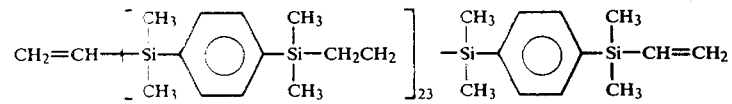

to this block.

III. Preparation of 1,4-bis-(dimethylvinylsilyl)-benzene.

150 cm$^3$ of a solution obtained by mixing 668 g of p-(vinyldimethylsilyl)-chlorobenzene with 1,020 cm$^3$ of tetrahydrofurane, 90 g of magnesium turnings and 3 cm$^3$ of methyl iodide were introduced into a 6 liter glass reactor equipped as described in I.

While stirring, the reaction mass was heated gently so as to effect formation of the magnesium compound of the formula:

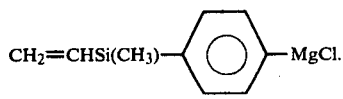

After initiation, the remainder of the solution was added over a period of 3 hours 40 minutes; the temperature of the reaction mixture changed from 63° C. to 74° C. during this addition.

The contents of the reactor were then heated at about 70°-75° C. for 10 hours. At the end of this period, the contents were diluted by introducing 1,000 cm$^3$ of isopropyl ether, and 430 g of vinyldimethylchlorosilane were then added over the course of 10 minutes. At the end of this addition, the temperature of the reaction mixture reached 66° C.; the mixture was heated for 2 hours at about 72° C. and then hydrolyzed with 800 cm$^3$ of an aqueous solution containing 0.8 mol of HCl and the organic phase was separated from the aqueous phase. Distillation of the organic phase made it possible to obtain 403 g of 1,4-bis-(dimethylvinylsilyl)-benzene which boiled at about 83° C. under a pressure of 0.35 mm of mercury.

IV. Preparation of 1,4-bis-(dimethylsilyl)-benzene.

25 cm$^3$ of a solution obtained by mixing 147 g of para-dichlorobenzene with 300 cm$^3$ of tetrahydrofurane, 49 g (approximately 2 mols) of magnesium turnings and a few crystals of iodine were introduced into a 3 liter glass reactor equipped as described in I.

While stirring, the reaction mass was heated gently so as to effect formation of the magnesium compound of the formula:

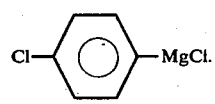

After initiation, the remainder of the solution was added over a period of 1 hour 30 minutes, the temperature of the reaction medium changed from 50° to 65° C. during this addition.

The contents of the reactor were then heated at about 50° C. for 3 hours, 15 minutes. At the end of this period, 94.5 g (1 mol) of dimethylchlorosilane were added over a period of 10 minutes.

The contents were then diluted by introducing 800 cm$^3$ of cyclohexane.

The mixture obtained was heated to about 60° C. and 94.5 g (one additional mol) of dimethylchlorosilane were then added thereto over a period of 1 hour, 45 minutes.

The reaction medium was heated at about 65° C. for 40 hours and then hydrolyzed with 500 cm³ of an aqueous solution containing 0.5 mol of HCl.

The organic phase was separated from the aqueous phase and distillation of the former made it possible to obtain 87 g of 1,4-bis-(dimethylsilyl)-benzene which boiled at about 104°-105° C. under a pressure of 19 mm of mercury.

EXAMPLE 2

I. Preparation of a block copolymer consisting of recurring units of the structural formula:

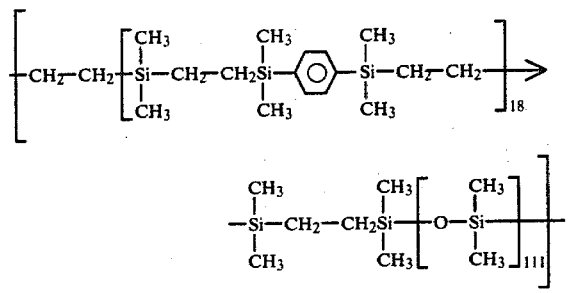

($x_1$) 6.87 g (0.061 mol) of dimethyldivinylsilane of the formula:

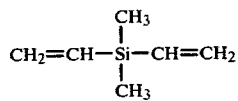

prepared by magnesium synthesis in accordance with the method of A. Wende and A. Gesierich, reported in the review *Plaste und Kautschuk*, 8, 301 (1961), 11.26 g (0.058 mol) of 1,4-bis-(dimethylsilyl)-benzene of the formula:

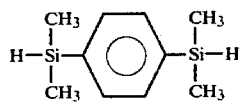

prepared as indicated in IV. of Example 1, and 54.4 g of toluene were introduced into a 250 cm³ glass reactor equipped as described in I. of Example 1.

The stirring was started, the nitrogen inlet was opened so as to protect the atmosphere in the round-bottomed flask from the surrounding air and the contents of the reactor were heated gradually to 60° C. When this temperature was reached, the heating was stopped and 0.3 cm³ of the catalyst solution based on chloroplatinic acid, described in I. of Example 1, was added. This resulted in a substantial increase in the temperature of the contents of the round-bottomed flask by about 20° C. The heating was reestablished and regulated so as to obtain a gentle reflux of the toluene, and the mixture was heated under these conditions for 50 minutes.

($y_1$) 27.18 g of an α,ω-dihydrogenopolydimethylsiloxane having a number-average molecular weight of 8,300, and 51.4 g. of toluene, were added to the contents of the reactor. 1 cm³ of the abovementioned catalyst solution was also added; the mixture was heated under reflux for 3 hours.

The solution of the copolymer, which resulted from this heating, was poured into 500 cm³ of absolute ethanol which was vigorously stirred. The copolymer precipitate in the form of fine particles which were filtered off, washed with ethanol and dried for 4 hours at about 100° C. under a pressure of 20 mm of mercury.

The intrinsic viscosity of the pulverulent copolymer measured at 20° C. in chloroform, was 0.43 dl/g.

Several batches of this powder were placed in molds where same were heated at 140° C. under a pressure of 30 bars for 10 minutes. This resulted in the formation of rubbery plates which possessed the following mechanical properties, without having undergone any prior heat treatment: Shore A hardness: 73; breaking strength: 69 kg/cm²; elongation at break: 555%; tear strength: 21 kg/cm.

These plates possessed a melting zone at about 130°-135° C. The analytical and spectrophotometric methods made it possible to assign the formula given above to the units constituting the copolymer.

This copolymer contained approximately 60% by weight of siloxane blocks:

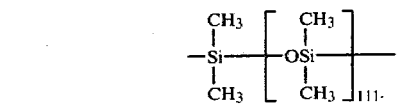

Despite this high proportion, its modulus of elasticity was still high [as shown in the table below] at temperatures above 110° C.; furthermore, this modulus hardly varied over a temperature range of 20° C. to 120° C.

| Temperatures in °C. | 20 | 100 | 110 | 120 |
|---|---|---|---|---|
| Modulus of elasticity in kg/cm² | $1.2 \times 10^7$ | $5 \times 10^6$ | $4 \times 10^6$ | $2.8 \times 10^6$ |

II. Separation of the intermediate crystallizable block.

The method of operation described in paragraph ($x_1$) under I. was repeated and the crystallizable block was then separated off by following the technique described in II. of Example 1. A whitish solid product remained which was ground and then dried for 1 hour at 100° C.

This solid had a melting point of 136° C., and a number-average molecular weight of 5,620.

The analytical and spectrophotometric methods made it possible to assign the structural formula:

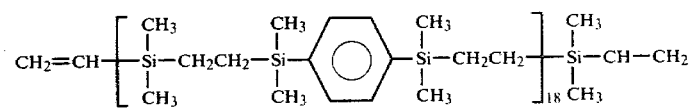

to this crystallizable block.

EXAMPLE 3

I. Preparation of a block copolymer consisting of recurring units of the structural formula:

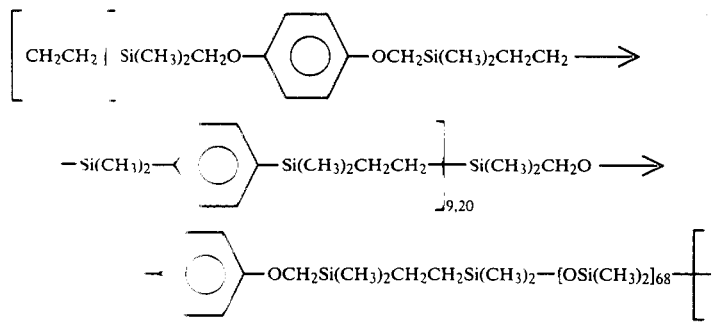

(x₂) 12.54 g (0.041 mol) of 1,4-bis-[(dimethylvinyl-silyl)methoxy]-benzene of the formula:

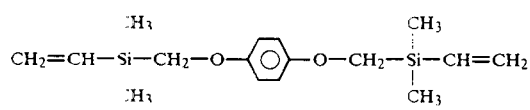

prepared as indicated below in part III, 7.18 g (0.037 mol) of 1,4-bis-(dimethylsilyl)-benzene of the formula:

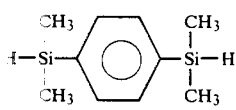

prepared as indicated in IV. of Example 1, and 59.2 g of toluene were introduced into a 250 cm³ glass reactor equipped as described in I. of Example 1.

The stirring was started, the nitrogen inlet was opened so as to protect the atmosphere in the reactor from the surrounding air and the contents of the reactor were heated gradually to 100° C. When this temperature was reached, the heating was stopped and 1 cm³ of the catalyst solution based on chloroplatinic acid, described in I. of Example 1, was added. A substantial temperature increase was immediately observed and this caused the toluene to boil. The heating was then re-established and regulated so as to maintain a gentle reflux in the reactor. This heating was continued for 35 minutes.

(y₂) 20.87 g of an α,ω-dihydrogenopolydimethylsiloxane having a number-average molecular weight of 5,100, and 35.5 g of toluene, were added. 0.2 cm³ of the abovementioned catalyst solution was also added. The mixture obtained was heated under reflux for 6 hours; the solution of the copolymer, which resulted from this heating, was spread as a 0.5 mm thick uniform layer onto a glass plate with the aid of a casting device. The coated plate was then heated at 100° C. under a pressure of about 15 mm of mercury for 1 hour. A rubbery film remained on the plate and same was cut into pieces; the pieces were placed in molds where they were subjected for 15 minutes to a temperature of 160° C. and a pressure of 15 bars.

This resulted in the formation of rubbery plates which possessed the following mechanical properties after a heat treatment at 80° C. for 24 hours: Shore A hardness: 77; breaking strength: 70 kg/cm²; elongation at break: 390%.

These plates additionally possessed a melting zone at about 100°–110° C. The intrinsic viscosity of the rubbery copolymer, at 20° C. in chloroform, was 0.4 dl/g.

The analytical and spectrophotometric methods made it possible to assign the formula given above to the recurring units constituting this copolymer.

This copolymer contained approximately 51.5% by weight of siloxane blocks: —Si(CH₃)₂[OSi(CH₃)₂]₆₈.

II. Separation of the intermediate crystallizable block.

The method of operation described in paragraph (x₂) was repeated and the crystallizable block was then separated off by following the technique described in II. of Example 1.

A solid product remained which was ground and then dried for 1 hour at 110° C. This solid had a melting point of 122° C. and a number-average molecular weight of 4,905.

The analytical and spectrophotometric methods made it possible to assign the formula:

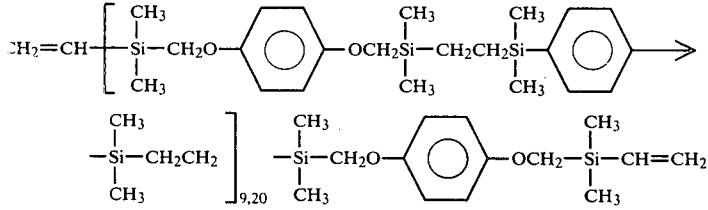

to this block.

III. Preparation of 1,4-bis-[(dimethylvinylsilyl)-methoxy]-benzene.

44 g (0.4 mol) of hydroquinone and 100 cm³ of methanol were introduced into a 1 liter glass reactor equipped with a plastic sheathed stirring system, a nitrogen inlet and a distillation column surmounted by an analyzer. The entire mass was heated gradually to about 60° C., under stirring. When this temperature was reached, a solution of 32 g of sodium hydroxide in 320 cm³ of methanol was added to the contents of the reactor; the addition was carried out over the course of 15 minutes. 300 cm³ of methanol were then removed from the reactor by distillation; 500 cm³ of N-methylpyrrolidone were then added gradually and the distillation was continued; same was stopped when the temperature of the mixture was 104° C. and the pressure was 32 mm of mercury [the volume distilled increasing to 526 cm³].

107.6 g (0.793 mol) of chloromethyldimethylvinylsilane of the formula $ClCH_2Si(CH_3)_2CH=CH_2$ were added, over a period of 20 minutes, to this new mixture, heated to about 120° C. The reaction medium was then concentrated by removing 256 cm³ of N-methylpyrrolidone by distillation. The residue was finally diluted by adding 500 cm³ of ethyl ether and the entire mass was washed with distilled water.

Distillation of the ether solution enabled recovery of 72.5 g of 1,4-bis-[(dimethylvinylsilyl)-methoxy]-benzene of the formula:

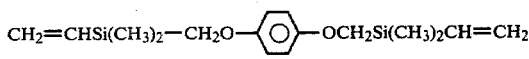

which boiled at about 123.2° C.-124.2° C. under a pressure of 0.2 mm of mercury; $n_D^{20}=1.404$.

| Elementary analysis in %: | | |
|---|---|---|
| | Calculated | Found |
| Carbon | 62.7 | 62.55–62.64 |
| Hydrogen | 9.1 | 8.99–8.93 |

EXAMPLE 4

I. Preparation of a block copolymer consisting of recurring units of the structural formula:

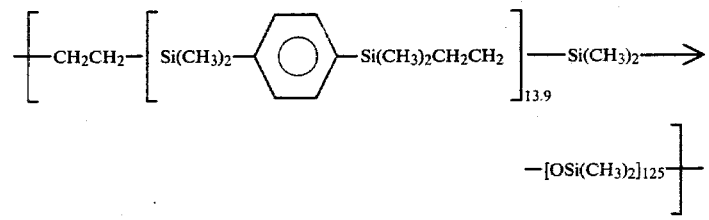

(x₃) 8.84 g (0.0402 mol) of 1-vinyldimethylsilyl-4-dimethylsilylbenzene of the formula:

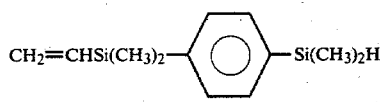

prepared as indicated below in part II, 0.76 (0.0031 mol) of 1,4-bis-(vinyldimethylsilyl)-benzene of the formula:

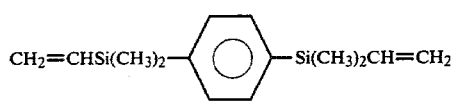

prepared as indicated in III. of Example 1, and 28.8 g of toluene were introduced into a 250 cm³ glass reactor equipped as described in I. of Example 1.

The contents of the reactor, which were protected from the surrounding air by a gentle stream of nitrogen, were stirred and then heated gradually to 80° C. At this temperature; the heating was stopped and 0.15 cm³ of the catalyst solution based on chloroplatinic acid, described in I. of Example 1, was added. This resulted in a temperature increase of 27° C. The heating was reestablished and regulated so as to obtain reflux of the toluene, and the reaction was carried out under these conditions for 30 minutes.

(y₃) 28.79 g of an α,ω-dihydrogenopolydimethylsiloxane having a number-average molecular weight of 9,300, and 60.8 g of toluene, were added to the contents of the round-bottomed flask. 0.8 cm³ of the above mentioned catalyst solution was also added. The mixture was heated under reflux for 4 hours, 30 minutes. The solution of the copolymer, which resulted from this heating was then poured into 600 cm³ of absolute ethanol which was vigorously stirred. This treatment caused the copolymer to precipitate in the form of whitish flakes; these flakes were ground, washed with 700 cm³ of absolute ethanol and dried for 8 hours at 80° C. under a pressure of 15 mm of mercury.

Several batches of the powder which was thus collected were placed in molds where same were heated at 170° C. under a pressure of 50 bars for 10 minutes. This resulted in the formation of plates which possessed the following mechanical properties: Shore A hardness: 72; breaking strength: 60 kg/cm²; elongation at break: 600%; tear strength: 18 kg/cm.

These plates possessed a melting zone at about 170° C.

The intrinsic viscosity of the pulverulent copolymer, measured at 20° C. in chloroform, was 0.57 dl/g.

The analytical and spectrophotometric methods used for the batches of powders made it possible to assign the formula given above to the recurring units constituting the copolymer.

This copolymer contained approximately 75% by weight of $-Si(CH_3)_2-[OSi(CH_3)_2]_{125}$ blocks.

Analysis carried out on the copolymer, using exclusion/diffusion chromatography on silica gel, indicated a weight-average molecular weight of 151,000 and a number-average molecular weight of 25,700 [standardization being carried out with calibrated polystyrene samples].

II. Preparation of 1-vinyldimethylsilyl-4-dimethylsilylbenzene.

113.82 g of magnesium turnings, 150 cm³ of tetrahydrofuran and 2 cm³ methyl iodide were introduced into a 5 liter glass reactor equipped as described in I. of Example 1.

The contents of the reactor were stirred and 40 cm³ of a solution obtained by mixing 767 g of para-(vinyldimethylsilyl)-chlorobenzene with 1,000 cm³ of tetrahydrofuran were introduced therein.

The entire mass was heated gently so as to effect formation of the magnesium compound of the formula:

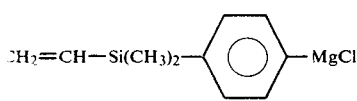

After initiation, the remainder of the solution was added over a period of 4 hours, 15 minutes; the temperature of the reaction medium changed from 68° to 82° C. during this addition.

The reaction mixture was then heated under reflux for 5 hours. At the end of this period, the heating was stopped, the mixture was left to cool to about 22° C. and 405.8 g of dimethylchlorosilane were added over the course of 20 minutes; the temperature changed from 22° C. to 55° C. during this addition.

After cooling, the entire mass was diluted by introducing 910 cm³ of ethyl ether. The diluted mixture thus obtained was then treated with 1 liter of distilled water. The organic phase was separated from the aqueous phase and distillation of the former enabled recovery of 704 g of 1-vinyldimethylsilyl-4-dimethylsilylbenzene of the formula:

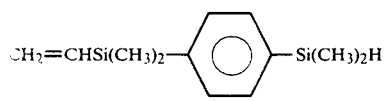

which boiled at about 107° C. under a pressure of 6 mm of mercury; $n_D^{20} = 1.5077$.

| Elementary analysis in %: | | |
|---|---|---|
| | Calculated | Found |
| Carbon | 65.4 | 64.2–65.8–65.3 |
| Hydrogen | 9.1 | 8.9–8.8–9.1 |

EXAMPLE 5

I. Preparation of a block copolymer consisting of recurring units of the structural formula:

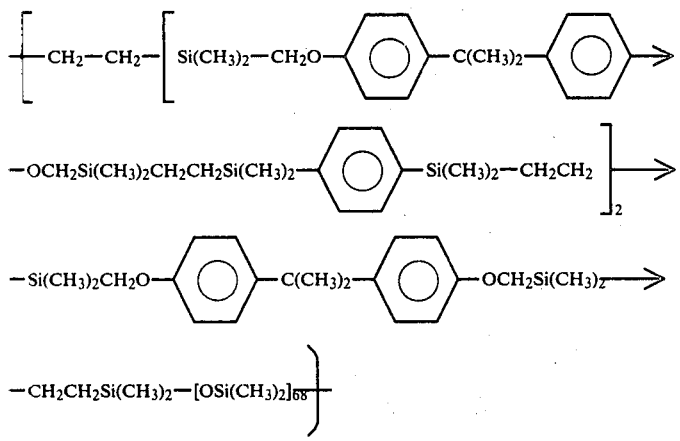

(x₄) 6.56 g (0.015 mol) of 2,2-bis-[4-(vinyldimethylsilyl)methoxyphenyl]-propane of the formula:

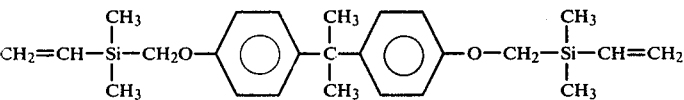

prepared as indicated below in part II, 2 g (0.01 mol) of 1,4-bis-(dimethylsilyl)-benzene of the formula:

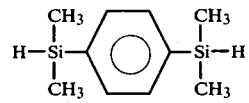

prepared as indicated in IV. of Example 1, and 25 g of dry toluene were introduced into a 250 cm³ glass reactor equipped as described in I. of Example 1.

The contents of the reactor, which were protected from the surrounding air by a gentle stream of nitrogen, were stirred and then heated gradually to 100° C.

When this temperature was reached, the heating was stopped and 0.3 cm³ of the catalyst solution based on chloroplatinic acid, described in I. of Example 1, was added. This resulted in a substantial temperature increase which caused the toluene to reflux. The heating was re-established and then regulated so as to maintain a gentle reflux of the contents of the round-bottomed flask for 30 minutes.

(y₄) After this period, 26.26 g of an α,ω-dihydrogenopolydimethylsiloxane having a number-average molecular weight of 5,100, and 55 g of toluene, were added. 0.16 cm³ of the abovementioned catalyst solution was also added.

The reaction mixture thus formed was heated for 7 hours at 110° C.; the solution of the copolymer, which resulted from this heating, was spread as a 0.55 mm thick layer onto a glass plate with the aid of a casting device. The coated plate was heated at 100° C. for 1 hour under a pressure of 15 mm of mercury. A rubbery film remained on the plate and was cut into pieces; these pieces were then placed in molds where they were subjected for 15 minutes to a temperature of 170° C. and a pressure of 15 bars. The plates obtained were withdrawn from the molds and then left for 24 hours at 80° C.

They possessed the following mechanical properties after this heat treatment: Shore A hardness: 52; breaking strength: 39 kg/cm²; elongation at break: 641%; tear strength: 12 kg/cm. These plates additionally possessed a melting zone at about 90° C. The analytical and spectrophotometric methods made it possible to assign the formula given above to the units constituting the copolymer.

This copolymer contains approximately 75% by weight of siloxane blocks: —Si(CH$_3$)$_2$[OSi(CH$_3$)$_2$-]-68.

Analysis carried out using exclusion/diffusion chromatography on silica gel indicated, for the copolymer, a number-average molecular weight of 43,220 and a weight-average molecular weight of 344,000 [standardization being carried out with calibrated polystyrene samples].

II. Preparation of 2,2-[4-(vinyldimethylsilyl)-methoxyphenyl]propane.

5.7 kg (25 mols) of 2,2-bis-(4-hydroxyphenyl)-propane of the formula:

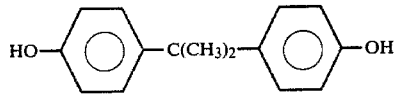

and 4 liters of methanol are charged into a double-walled stainless steel reactor which had a capacity of 110 liters and was equipped with a stirring system and a distillation column.

The contents of the reactor were heated gradually up to 71° C. When this temperature was reached, a solution of 2 kg of sodium hydroxide in 20 liters of methanol was introduced into the reactor over a period of 1 hour.

15 liters of methanol were subsequently removed by distillation, 40 liters of N-methylpyrrolidone were then added gradually and the distillation was continued. It was stopped when the temperature of the mixture was 132° C. and the pressure was 80 mm of mercury [the volume distilled increasing to 30.5 liters].

6.725 kg of chloromethyldimethylvinylsilane of the formula ClCH$_2$Si(CH$_3$)$_2$CH=CH$_2$ were then introduced over a period of 30 minutes and at a temperature of 131°–133° C.; the entire mass was kept at 125°–130° C. for 1 hour, 15 minutes.

The reaction mixture obtained was concentrated by distilling 18 liters of N-methylpyrrolidone, and the residue, which was still hot (90° C.), was run into 70 liters of distilled water. A precipitate formed which was filtered off, washed with water and dried; 10.4 kg of a crude product were thus collected and this was recrystallized from a first mixture consisting of 60 liters of ethanol and 20 liters of ethyl acetate.

The crystals recovered were recrystallized from a second mixture consisting of 51.75 liters of ethanol and 17.25 liters of butyl acetate.

Finally, 6.6 kg of 2,2-bis-[4-(vinyldimethylsilyl)methoxyphenyl]-propane of the formula:

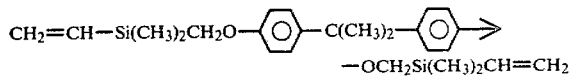

which had a melting point of 136° C. were collected.

| Elementary analysis in %: | Calculated | Found |
|---|---|---|
| Carbon | 70.75 | 70.1–69.9–70.95 |
| Hydrogen | 8.49 | 8.71–8.98–8.22 |

EXAMPLE 6

Preparation of a block copolymer consisting of recurring units of the structural formula:

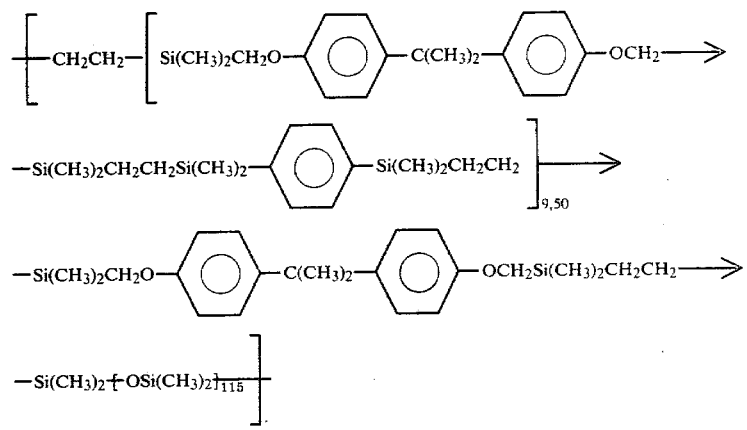

(x$_5$) 57.91 g (0.13 mol) of 2,2-bis-[4-vinyldimethylsilyl)methoxyphenyl]-propane of the formula:

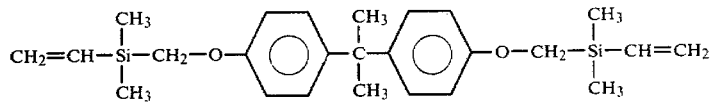

prepared as indicated in II. of Example 5, 23.82 g (0.12 mol) of 1,4-bis-(dimethylsilyl-benzene of the formula:

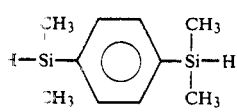

of this modulus [expressed in kg/cm$^2$] reached $2.5 \times 10^6$ at 100° C. and increased to $1.1 \times 10^7$ at 20° C.

EXAMPLE 7

I. Preparation of the block copolymer consisting of recurring units of the structural formula:

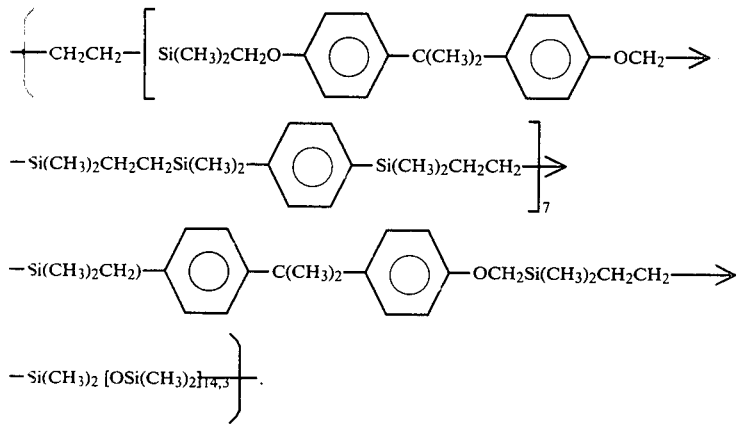

prepared as indicated in IV. of Example 1, and 245 g of toluene were introduced into a 1 liter glass reactor equipped as described in I. of Example 1.

The contents of the reactor, which were protected from the surrounding air by a gentle stream of nitrogen, were stirred and then heated gradually to 95° C. When this temperature was reached, the heating was stopped and 4 cm$^3$ of the catalyst solution based on chloroplatinic acid, described in I. of Example 1, were added. This resulted in a temperature increase which caused the toluene to reflux. The heating was reestablished and regulated so as to maintain a slight reflux of the contents of the round-bottomed flask for 44 minutes.

(y$_5$) At the end of this period, 122.48 g of an α,ω-dihydrogenopolydimethylsiloxane havine a number-average molecular weight of 8,600, and 230 g of toluene, were added to the contents of the round-bottomed flask. The mixture was heated under reflux for 5 hours, 30 minutes; the solution of the copolymer, which resulted from this heating, was then poured into 2½ liters of absolute ethanol. The copolymer precipitated in the form of whitish crystals which were filtered off, washed with absolute ethanol and dried at 100° C. for 2 hours under a pressure of 15 mm of mercury.

The powder thus collected was placed in molds where same was subjected to a temperature of 190° C. under a pressure of 30 bars for 20 minutes. This resulted in the formation of rubbery plates which possessed the following mechanical properties after a heat treatment at 80° C. for 24 hours: Shore A hardness: 76; breaking strength: 93 kg/cm$^2$; elongation at break: 580%; tear strength: 30 kg/cm.

These copolymer contained approximately 60% by weight of siloxane blocks: —Si(CH$_3$)$_2$[OSi(CH$_3$)$_2$]$_{115}$.

Despite this high proportion, its modulus of elasticity was still high in the region of 100° C.; in fact, the value (x$_6$) 21.67 g (0.05 mol) of 2,2-bis-[4-(vinyldimethylsilyl)methoxyphenyl]-propane of the formula:

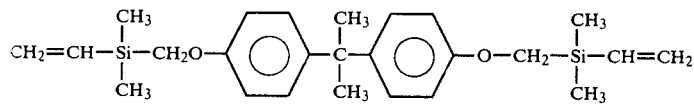

prepared as indicated in II. of Example 5, 8.66 g. (0.044 mol) of 1,4-bis-(dimethylsilyl)benzene of the formula:

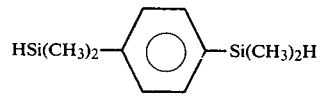

prepared as indicated in IV. of Eexample 1, and 75 g of toluene were introduced into a 250 cm$^3$ glass reactor equipped as described in I. of Example 1.

The contents of the round-bottomed flask, which were protected from the surrounding air by the flow of a gentle stream of nitrogen, were stirred and then heated gradually to 100° C. When this temperature was reached, the heating was stopped and 1.34 cm$^3$ of the catalyst solution based on chloroplatinic acid, useed in I. of Example 1, were added. This resulted in a temperature increase which caused the mixture to boil. The heating was re-established and regulated so as to obtain a gentle reflux, and the reaction was carried out under these conditions for 25 minutes.

(y$_6$) 7.02 g of an α,ω-dihydrogenopolydimethylsiloxane having a number-average molecular weight of 1,100, and 12.5 g of toluene, were added to the contents of the round-bottomed flask.

0.2 cm$^3$ of the abovementioned catalyst solution was also added. The mixture was heated under reflux for 6 hours.

The solution of the copolymer, which resulted from this heating, was also spread as a 0.5 mm thick layer onto a glass plate with the aid of a casting device. The entire mass was heated at 100° C. under a pressure of 15 mm of mercury for 1 hour. A rubbery film remained on the plate and this was cut into pieces; these pieces were then placed in molds where they were subjected for 15 minutes to a temperature of 170° C. and a pressure of 15 bars. This resulted in the formation of plates of elastomer which possessed the following mechanical properties after a heat treatment at 80° C.: Shore D hardness: 58; breaking strength: 236 kg/cm²; elongation at break: 599%; tear strength: 94 kg/cm.

These plates additionally possessed a melting zone at about 120° C.

The intrinsic viscosity of the copolymer [in the form of film], measured at 20° C. in chloroform, was 0.4 dl/g.

rated off by following the technique described in II. of Example 1.

A solid product remained which was ground and then dried for 1 hour at 100° C. This solid had a melting point of 128° C. and a number-average molecular weight of 4,750.

The analytical and spectrophotometric methods made it possible to assign the formula:

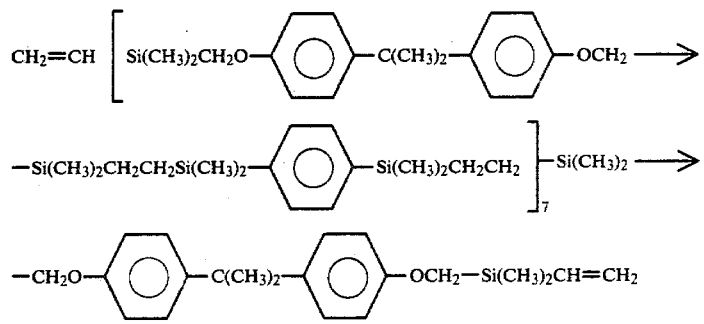

to this block.

EXAMPLE 8

Preparation of a block copolymer consisting of recurring units of the structural formula:

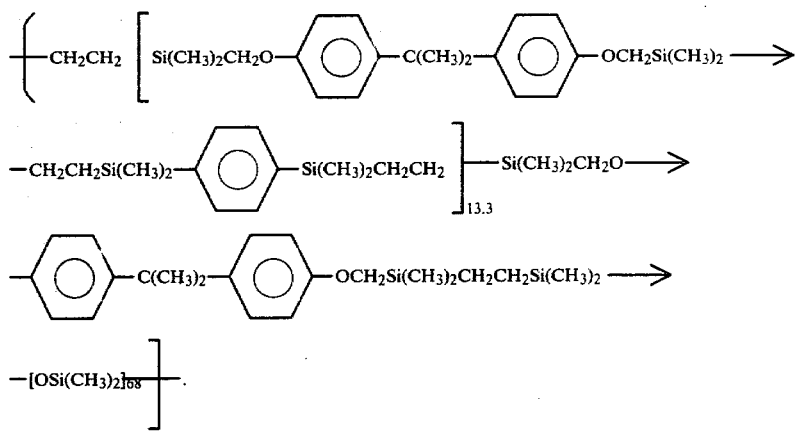

The analytical and spectrophotometric methods made it possible to assign the formula given above to the recurring units constituting this copolymer.

This copolymer contained approximately 19% by weight of siloxane blocks: —Si(CH₃)₂[OSi(CH₃)₂]₁₄,₃.

Furthermore, analysis carried out using exclusion-/diffusion chromatography on silica gel indicated, for the copolymer, a number-average molecular weight of 34,000 and a weight-average molecular weight of 302,000 [standardization being carried out with calibrated polystyrene samples].

II. Separation of the intermediate crystallizable block.

The method of operation described in paragraph (x₆) was repeated and the crystallizable block was then separated.

(x₇) 21 g (0.049 mol) of 2,2-bis-[4-(vinyldimethylsilyl)methoxyphenyl]-propane of the formula:

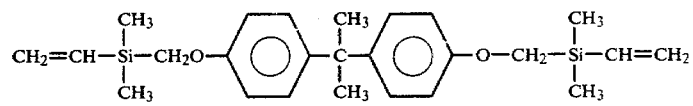

prepared as indicated in II. of Example 5, 8.95 g (0.046 mol) of 1,4-bis-(dimethylsilyl)-benzene of the formula :

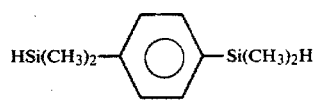

prepared as indicated in IV. of Example 1, and 90 g of toluene were introduced into a 250 cm³0 reactor equipped as described in I. of Example 1.

The contents of the reactor, which were protected from the surrounding air by a nitrogen atomsphere, were stirred and then heated gradually to 100° C. When this temperature was reached, the heating was stopped and 1.3 cm³ of the catalyst solution used in I. of Example 1 were added. This resulted in a temperature increase which caused the mixture to boil. The heating was re-established and regulated so as to obtain a gentle reflux. These conditions were maintained for 40 minutes.

(y₇) 19.01 g of an α,ω-dihydrogenopolydimethylsiloxane having a number-average molecular weight of 5,100, and 22 g of toluene, were then run in. The mixture was heated for 5 hours under reflux; the solution of the copolymer, which resulted from this heating, was spread as a 0.5 mm layer onto a glass plate with the aid of a casting device. The coated plate was then heated for 1 hour at 100° C. under a pressure of 15 mm of mercury. A rubbery film remained on the glass plate and was cut into pieces; these pieces were then placed in molds where they were subjected for 20 minutes to a temperature of 170°-180° C. and a pressure of 30 bars. The plates of elastomer which were thus formed were subjected to a heat treatment at 80° C. for 24 hours; after this treatment, they possessed the following mechanical properties: Shore D hardness: 51; breaking strength: 160 kg/cm²; elongation at break: 509%; tear strength: 57 kg/cm. These plates additionally possessed a melting zone at about 120° C.

The analytical and spectrophotometric methods made it possible to assign the formula given above to the recurring units constituting this copolymer; this copolymer contained approximately 37.6% by weight of siloxane blocks: —Si(CH₃)₂[OSi(CH₃)₂]₆₈.

EXAMPLE 9

Preparation of a block copolymer consisting of recurring units of the structural formula:

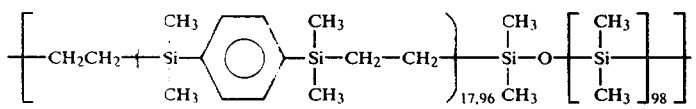

(a) Preparation of the α,ω-bis-(hydrogenodimethylsilyl)organosilicic compound of the formula:

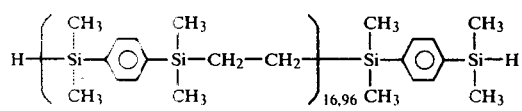

8.6881 g (0.0352 mol) of 1,4-bis-(dimethylvinyl)benzene of the formula:

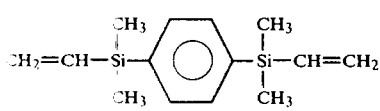

7.6498 g (0.0393 mol) of 1,4-bis-(dimethylhydrogenosilyl)benzene of the formula:

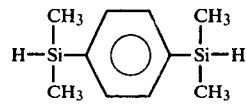

and 30 g of distilled toluene were introduced into a 250 cm³ glass reactor equipped with a stirring system, a reflux condenser and a thermometer.

The contents of the reactor, which were protected from the surrounding air by a gentle stream of nitrogen, were stirred and then heated gradually up to 72° C. At this temperature, the heating was stopped and 0.2 ml of a catalyst solution based on chloroplatinic acid was added. This resulted in a temperature increase of 35° C. The heating was re-established and regulated so as to obtain reflux of the toluene. These conditions were maintained for 2 hours.

(b) Preparation of the copolymer.

30.3015 g of an α,ω-divinylpolydimethylsiloxane having a number-average molecular weight of 7,400 [from determination of the vinyl groups], and 44 g of distilled toluene were added to the contents of the round-bottomed flask prepared above. 0.9 ml of catalyst solution was also added. The mixture was heated under reflux for 3 hours.

The solution of the copolymer, resulting from this heating, was then poured into 400 cm³ of absolute ethanol which was vigorously stirred. This treatment caused the copolymer to precipitate in the form of white flakes; these flakes were ground and washed with 400 cm³ of absolute ethanol and dried for one night at 110° C. under a pressure of 400 mm of mercury.

The intrinsic viscosity of the copolymers, measured at 20° C. in chloroform, was 0.57 dl/g.

Several samples of this powder were placed in molds where they were heated at 200° C. under a pressure of 100 bars for 15 minutes. This resulted in the formation of 2 mm thick, transparent, slightly cloudy plates which possessed the following mechanical properties: Shore A hardness: 77; Breaking strength: 84 kg/cm²; Elongation at break: 420%.

These plates additionally possessed a melting zone at about 170°-180° C. This copolymer contained approximately 65% by weight of siloxane blocks.

EXAMPLE 10

Preparation of a block copolymer consisting of recurring units of the structural formula:

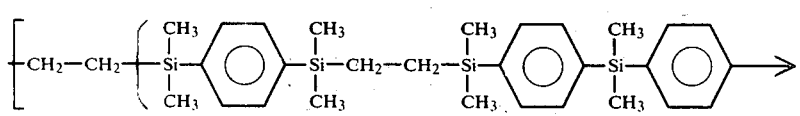

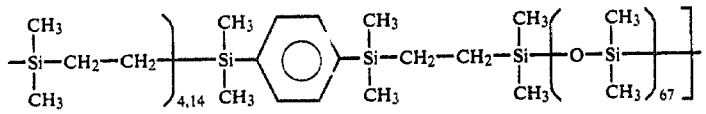

(a) Preparation of the α,ω-bis-(vinyldimethylsilyl)organosilicic compound of the structural formula:

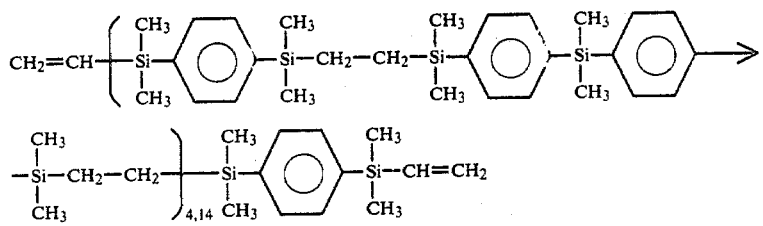

6.9695 g (0.028 mol) of 1,4-bis-(dimethylvinylsilyl)-benzene of the formula:

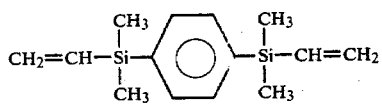

7.4825 g (0.023 mol) of dimethyl-bis-(dimethylsilylphenyl)silane of the formula:

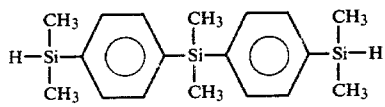

and 43.4 g of distilled toluene were introduced into a 250 cm³ glass reactor equipped with a stirring system, a reflux condenser and a thermometer.

The contents of the reactor, which were protected from the surrounding air by a gentle stream of nitrogen, were stirred and then heated gradually up to 75° C. At this temperature, the heating was stopped and 0.2 ml of a catalyst solution based on chloroplatinic acid was added. This resulted in a temperature increase of 18° C. The heating was re-established and regulated so as to obtain reflux of the toluene. These conditions were maintained for about 50 minutes.

(b) Preparation of the copolymer.

28.0424 g of an α,ω-dihydrogenopolydimethylsiloxane having a number-average molecular weight of 5,100, and 35.5 g of distilled toluene, were added to the round-bottomed flask which was obtained above and contained the α,ω-bis-(vinyldimethyldilyl)organosilicic compound.

1 ml. of catalyst solution was also added.

The mixture was heated under reflux for 2 hours, 20 minutes.

The solution of the copolymer, which resulted from this heating, was then poured into 750 ml of absolute ethanol which was vigorously stirred. This treatment caused a copolymer to precipitate in the form of white flakes. These flakes were ground and washed with 750 ml of absolute ethanol and dried for 20 hours at 80° C. at atmospheric pressure.

The intrinsic viscosity of the copolymer, measured at 20° C. in chloroform, was 1.16 dl/g.

Several samples of this powder were placed in molds where they were heated at 210° C. under a pressure of 200 bars for 20 minutes. The molds were then cooled in a water bath at 17° C.

This resulted in the formation of 2 mm thick, transparent, slightly cloudy plates which were baked for 35 minutes at 80° C. After baking, the copolymer remained fusible and soluble. The plates possessed the following properties: Shore A hardness: 75; Breaking strength: 119 kg/cm²; Elongation at break: 713%.

The plates additionally possessed a melting zone at about 160°–170° C. The copolymer contained 66% by weight of siloxane blocks.

While the invention has been described and illustrated with reference to certain preferred embodiments thereof, those skilled in the art will appreciate that various changes, modifications and substitutions therein can be made without departing from the spirit of the invention. It is intended, therefore, that the invention be limited only by the scope of the claims which follow:

What is claimed is:

1. A thermoplastic, crystalline block copolymer comprising a plurality of recurring units selected from the group consisting of those of the structural formulae $F_1$ and $F'_1$, and combinations thereof:

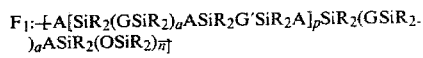

and

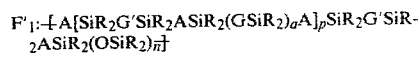

in which the symbols A, which are identical, represent linear or branched chain alkylene radicals having from 2 to 6 carbon atoms, or cyclohexylene radicals;

the symbols R, which are identical or different, represent alkyl and halogenoalkyl radicals having from 1 to 5 carbon atoms, cycloalkyl and halogenocycloalkyl radicals having from 3 to 8 carbon atoms, aryl and halogenoaryl radicals having from 6 to 8 carbon atoms or cyanoalkyl radicals having from 3 to 4 carbon atoms;

the symbols G, which are identical, represent linear or branched chain alkylene radicals having from 1 to 8 carbon atoms, divalent organic radicals corresponding to the formula $F_2$:- $-(CH_2)_xQTQ(CH_2)_{-x}$, in which the symbols Q, which are identical, represent one of the groups —O— and —OCO—, the —OCO— being bonded to T by the —CO— radical, the symbol T represents a monocyclic, divalent hydrocarbon radical having from 6 to 8 carbon atoms, or a divalent organic radical which has from 10 to 22 carbon atoms and consists of 2 hydrocarbon rings which are fused to one another or bonded together by a valence bond or by one of the groups of the formulae —O—, —CH$_2$—, —C(CH$_3$)$_2$— and —Si(R'—)$_2$, wherein R' is an alkyl radical having from 1 to 3 carbon atoms, and the symbols x, which are identical, represent 1, 2 or 3, or divalent hydrocarbon radicals corresponding to the formula F$_3$: -(-CH$_2$)$_b$T(CH$_2$)$_b$-, in which the symbol T has the meaning given for the formula F$_2$ and the symbols b, which are identical, represent 0 or 1;

the symbols G', which are identical, have the meaning given above for G, except that they do not correspond to the formula F$_2$;

the symbols a, which are identical, represent 0 or 1;

the symbol p represents any number ranging from 1 to 120; and the symbol n represents any number ranging from 1 to 1,500.

2. A block copolymer as defined by claim 1, wherein in the formulae F$_1$ and F'$_1$, the symbols A represent a member selected from the group consisting of ethylene and 1,3-propylene.

3. A block copolymer as defined by claims 1 or 2, wherein, in the formulae F$_1$ and F'$_1$, the symbols R represent a member selected from the group consisting of methyl, ethyl, n-propyl or phenyl.

4. A block copolymer as defined by claim 3, wherein, in the formulae F$_1$ and F'$_1$, the symbols G represent divalent radicals of the formula F$_2$, in which the symbol T represents a member selected from the group consisting of para-phenylene, para-cyclohexylene, 1,5-naphthylene or 2,7-naphthylene, and a radical of the formulae:

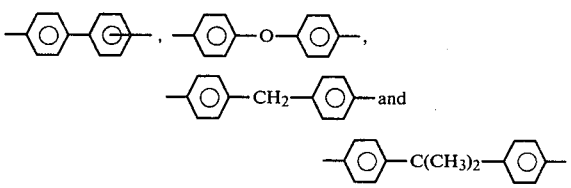

5. A block copolymer as defined by claim 4, wherein in the formulae F$_1$ and F'$_1$, the symbols G represent a member selected from those divalent radicals of the formulae:

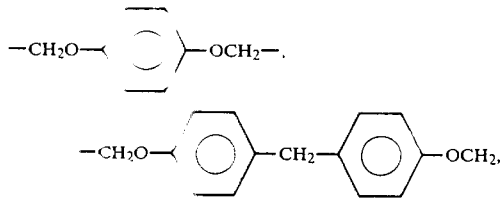

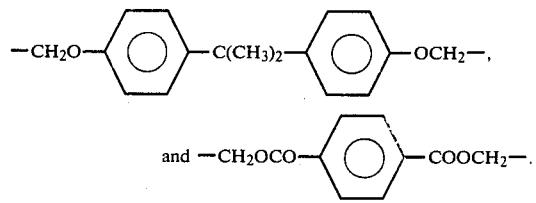

6. A block copolymer as defined by claim 3 wherein, in the formulae F$_1$ and F'$_1$, the symbols G and G' represent a member selected from the group consisting of ethylene and 1,4-butylene.

7. A block copolymer as defined by claim 3, wherein, in the formulae F$_1$ and F'$_1$, the symbols G and G' represent divalent radicals of the formula F$_3$, in which the symbol T represents a member selected from the group consisting of para-phenylene, para-cyclohexylene, 1,5-naphthylene or 2,7-naphthylene, and a radical of the formulae:

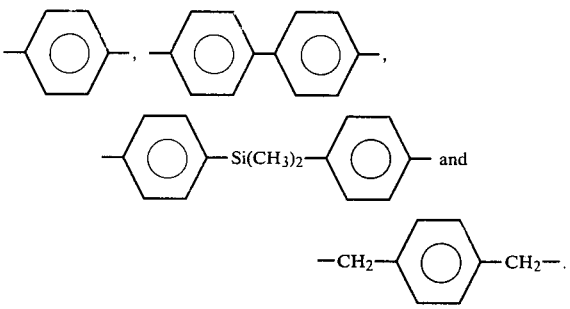

8. A block copolymer as defined by claim 7, wherein, in the formulae F$_1$ and F'$_1$, the symbols G and G' represent divalent radicals of the formulae:

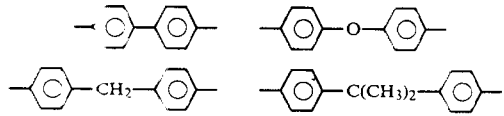

9. A block copolymer as defined by claim 1, comprising a plurality of recurring units of the structural formula F''$_1$:

-(-A(SiR$_2$G'SiR$_2$A)$_{2p}$SiR$_2$G'SiR$_2$ASiR$_2$(OSiR$_2$)$_n$-)- corresponding to the formula F$_1$ and F'$_1$, in which the symbols G are identical to G' and the symbols a represent 1.

10. A block copolymer as defined by claim 1, comprising a plurality of recurring units selected from the group consisting of those of the structural formulae:

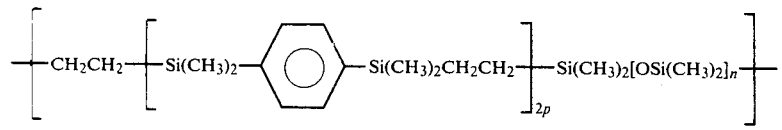

p and n, in pairs, =12 and 111; 6.95 and 125,

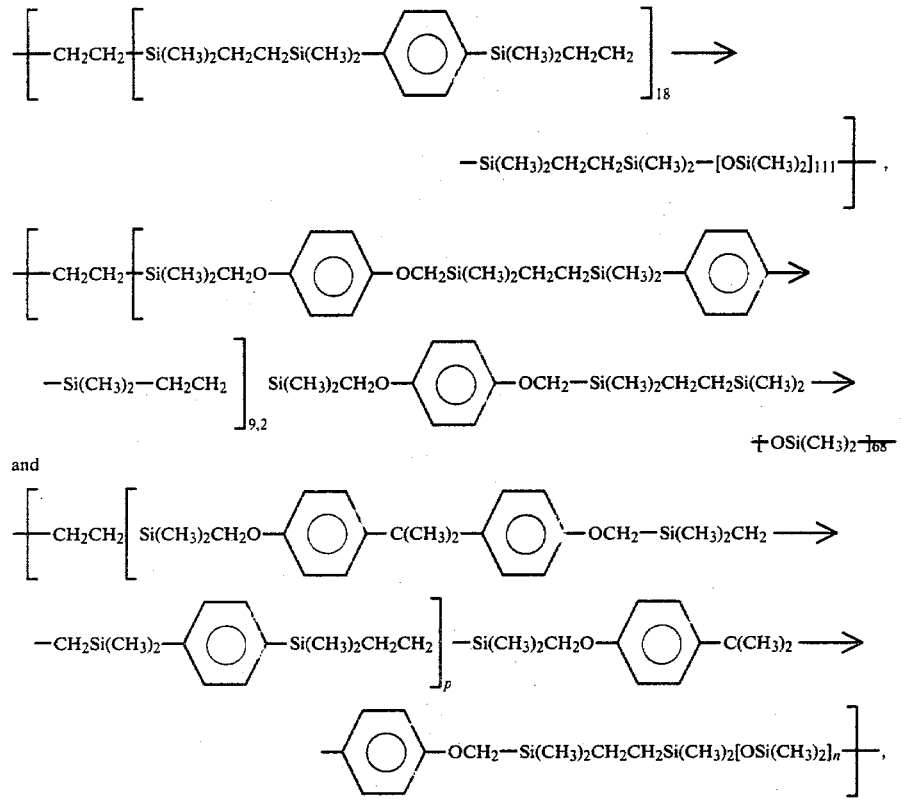

p and n, in pairs, =2 and 68; 3 and 37; 7 and 14.3; 9.5 and 115; 13.3 and 68.

11. A process for the preparation of a block copolymer comprising the structural formula $F_1$ units as defined by claim 1, wherein:

(i) a crystalline organosilicic copolymer having the structural formula $F_f$:

$$A'[SiR_2(GSiR_2)_aASiR_2G'SiR_2A]_pSiR_2(GSiR_2)_aA'$$

is prepared by polyaddition of p+1 units of the diethylenic organosilicic compound of the formula $A'SiR_2(GSiR_2)_aA'$ and p units of the dihydrogenated organosilicic compound of the formula $HSiR_2G'SiR_2H$, and (ii) at least one unit of the organosilicic copolymer of the formula $F_f$ is then reacted with at least one unit of the α,ω-dihydrogenopolydiorganosiloxane of the formula $HSiR_2(OSiR_2)_nH$, and wherein the above formulae, the symbols A, R, G, G', a, p and n have the meaning of the symbols included in the formula $F_1$, and the symbols A', which are identical, represent linear or branched chain alkenyl radicals having from 2 to 6 carbon atoms, or cyclohexenyl radicals.

12. A process for the preparation of a block copolymer comprising the structural formula $F'_1$ units as defined by claim 1, wherein:

(i) a crystalline organosilicic copolymer having the structural formula $F_h$:

$$H[SiR_2G'SiR_2ASiR_2(GSiR_2)_aA]_pSiR_2G'SiR_2H$$

is prepared by polyaddition of p+1 units of the dihydrogenated organosilicic compound of the formula $HSiR_2G'SiR_2H$ and p units of the diethylenic organosilicic compound of the formula $A'SiR_2(GSiR_2)_aA'$, and (ii) at least one unit of the organosilicic copolymer of the formula $F_h$ is then reacted with at least one unit of the α,ω-diethylenic polydiorganosiloxane of the formula $A'SiR_2(OSiR_2)_nA'$, and wherein the above formulae, the symbols A, R, G, G', a, p and n have the meaning of the symbols included in the formula $F_1$, and the symbols A', which are identical, represent linear or branched chain alkenyl radicals having from 2 to 6 carbon atoms, or cyclohexenyl radicals.

13. A process for the preparation of a block copolymer comprising the structural formula $F''_1$ units as defined by claim 9, wherein:

(i) a crystalline organosilicic copolymer having the formula $F'_f$:

$$A'[SiR_2G'SiR_2A]_{2p}SiR_2G'SiR_2A'$$

is prepared by polyaddition of the hydrogenomonoethylenic organosilicic compound of the formula $A'SiR_2G'SiR_2H$ with itself 2p times, in the presence of one unit of a compound of the formula $A'SiR_2G'SiR_2A'$ as the blocking element, and (ii) at least one unit of the copolymer of the formula $F'_f$ is then reacted with at least one unit of the α,ω-dihydrogenopolydiorganosiloxane of the formula $HSiR_2(OSiR_2)_nH$, and wherein the above formulae, the symbols A, R, G, G', a, p and n have the meaning of the symbols included in the formula $F_1$, and the symbols A', which are identical, represent linear or branched chain alkenyl radicals having from 2 to 6 carbon atoms, or cyclohexenyl radicals.

14. A process for the preparation of a block copolymer comprising the structural formula F"₁ units as defined by claim 9, wherein:

(i) a crystalline organosilicic copolymer having the structural formula F'ₕ:

H[SiR₂G'SiR₂A]₂ₚSiR₂G'SiR₂H is prepared by polyaddition of the hydrogenomonoethylenic organosilicic compound of the formula A'-SiR₂G'SiR₂H with itself 2p times, in the presence of one unit of a compound of the formula HSiR₂G'SiR₂H as the blocking element, and (ii) at least one unit of the copolymer of the formula F'ₕ is then reacted with at least one unit of the α,ω-diethylenic polydiorganosiloxane of the formula A'SiR₂(OSiR₂)ₙA', and wherein the above formulae, the symbols A, R, G, G', a, p and n have the meaning of the symbols included in the formula F₁, and the symbols A', which are identical, represent linear or branched chain alkenyl radicals having from 2 to 6 carbon atoms, or cyclohexenyl radicals.

15. A process as defined by any of claims 11 to 14, wherein each reaction is carried out in the presence of a metal catalyst or of inorganic or organic derivatives thereof, said metal being selected from the group consisting of platinum, palladium, ruthenium, rhodium, and iridium.

16. A process as defined by claim 15, wherein each reaction is carried out in a solution or suspension of an inert organic solvent selected from the group consisting of aliphatic and cycloaliphatic hydrocarbons, halogenated derivatives thereof, aromatic hydrocarbons, and halogenated aromatic hydrocarbons.

17. A process as defined by claim 16, wherein the second stage reaction takes place in the homogeneous reaction medium of the first stage, without first isolating the organosilicic copolymer F$_i$, F$_h$, F'$_i$ or F'$_h$.

18. A thermoplastic, crystalline block copolymer comprising a plurality of recurring units selected from the group consisting of those of the structural formulae F₁ and F', and combinations thereof:

F₁: ₊A
SiR₂(GSiR₂)ₐASiR₂G'SiR₂A)ₚSiR₂(GSiR₂-
ₐASiR₂(OSiR₂)ₘ₊ and

F': ₊A
SiR₂G'SiR₂ASiR₂(GSiR₂)ₐA]ₚSiR₂G'SiR-
₂ASiR₂(OSiR₂)ₘ₊ in which the symbols A, which are identical, represent linear or branched chain alkylene radicals having from 2 to 6 carbon atoms, or cyclohexylene radicals;

the symbols R, which are identical or different, represent alkyl and halogenoalkyl radicals having from 1 to 5 carbon atoms, cycloalkyl and halogenocycloalkyl radicals having from 3 to 8 carbon atoms, aryl and halogenoaryl radicals having from 6 to 8 carbon atoms, cyanoalkyl radicals having from 3 to 4 carbon atoms;

the symbols G, which are identical, represent divalent organic radicals corresponding to the formula F₂: ₊CH₂)ₓQTQ(CH₂)ₓ, in which the symbols Q, which are identical, represent one of the groups —O— and —OCO—, the —OCO— being bonded to T by the —CO— radical, the symbol T represents a monocyclic, divalent hydrocarbon radical having from 6 to 8 carbon atoms, or a divalent organic radical which has from 10 to 22 carbon atoms and consists of 2 hydrocarbon rings which are fused to one another or bonded together by a valence bond or by one of the groups of the formulae —O—, —CH₂—, —C(CH₃)₂— and —Si(R')₂, wherein R' is an alkyl radical having from 1 to 3 carbon atoms, and the symbols x, which are identical, represent 1, 2 or 3, or divalent hydrocarbon radicals corresponding to the formula F₃: ₊CH₂)ᵦT(CH₂)ᵦ, in which the symbol T has the meaning given for the formula F₂ and the symbols b, which are identical, represent 0 or 1;

the symbols G', which are identical, represent linear or branched chain alkylene radicals having from 1 to 8 carbon atoms, or divalent hydrocarbon radicals of the formula F₃;

the symbols a, which are identical, represent 0 or 1;

the symbol p represents any number ranging from 1 to 120; and the symbol n represents any number ranging from 1 to 1,500.

19. A block copolymer as defined by claim 18, wherein in the formulae F₁ and F'₁, the symbols A represent a member selected from the group consisting of ethylene and 1,3-propylene.

20. A block copolymer as defined by claims 18 or 19 wherein, in the formulae F₁ and F'₁, the symbols R represent a member selected from the group consisting of methyl, ethyl, n-propyl or phenyl.

21. A block copolymer as defined by claim 20, wherein, in the formulae F₁ and F'₁, the symbols G represent divalent radicals of formula F₂, in which the symbol T represents a member selected from the group consisting of para-phenylene, para-cyclohexylene, 1,5-naphthylene or 2,7-naphthylene, and a radical of the formulae:

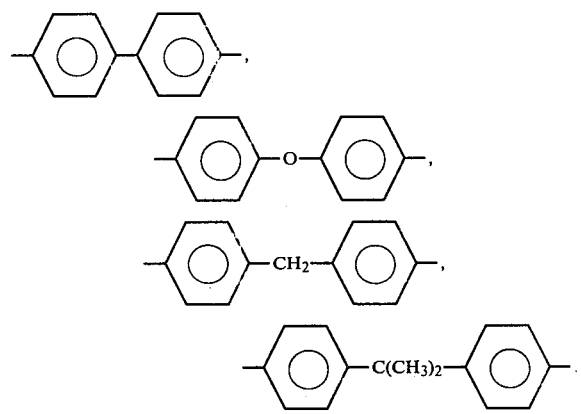

22. A block copolymer as defined by claim 21, wherein in the formulae F₁ and F'₁, the symbols G represent a member selected from those divalent radicals of the formulae:

-continued

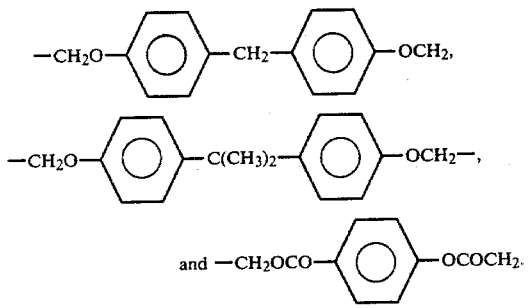

23. A block copolymer as defined by claim 21 wherein, in the formulae $F_1$ and $F'_1$, the symbol $G'$ represents a member selected from the group consisting of ethylene and 1,4-butylene.

24. A blockc copolymer as defined by claim 20, wherein, in the formulae $F_1$ and $F'_1$, the symbols G and $G'$ represent divlent radicals of the formula $F_3$, in which the symbol T represents a member selected from the group consisting of para-phenylene, para-cyclohexylene, 1,5-naphthylene or 2,7-naphthylene, and a radical of the formulae:

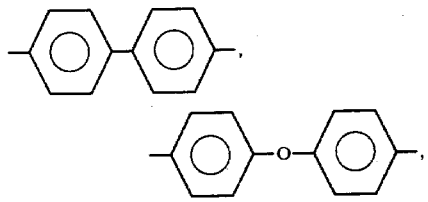

-continued

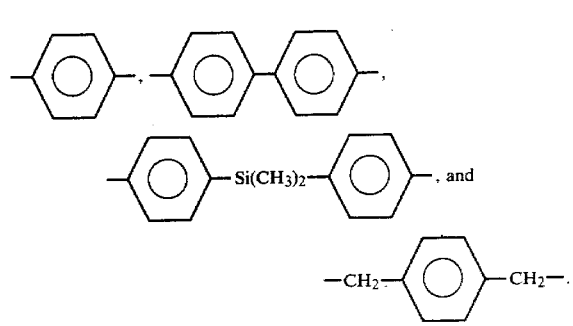

25. A block copolymer as defined by claim 20, wherein in the formulae $F_1$ and $F'_1$, the symbols G and $G'$ represent divalent radicals of the formulae:

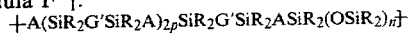

26. A block copolymer as defined by claim 18, comprising a plurality of recurring units of the structural formula $F''_1$:

$$+A(SiR_2G'SiR_2A)_{2p}SiR_2G'SiR_2ASiR_2(OSiR_2)_n+$$

corresponding to the formula $F_1$ and $F'_1$, in which the symbols G are identical to $G'$ and the symbols a represent 1.

27. A block copolymer as defined in claim 18, comprising a plurality of recurring units selected from the group consisting of those of the structural formulae:

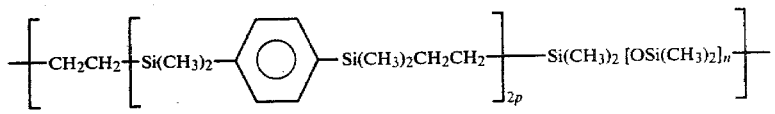

p and n, in pairs, = 12 and 111; 6.95 and 125;

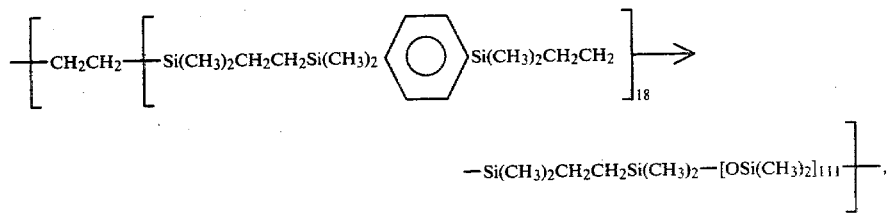

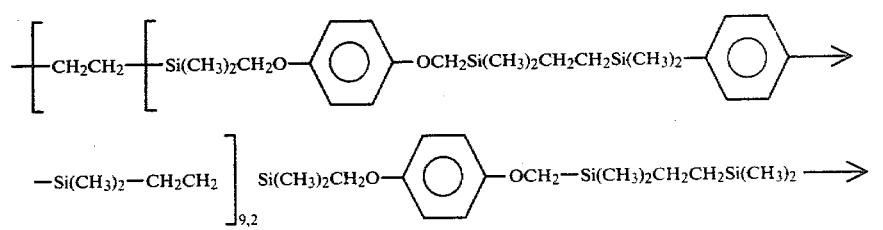

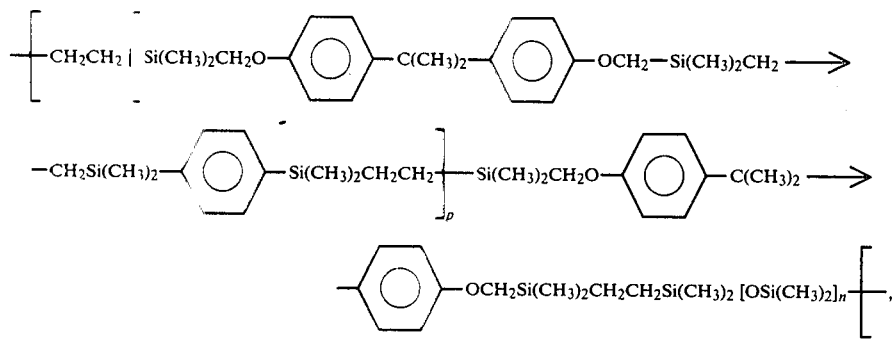
p and n, in pairs, =2 and 68; 3 and 37; 7 and 14.3; 9.5 and 115; 13.3 and 68;
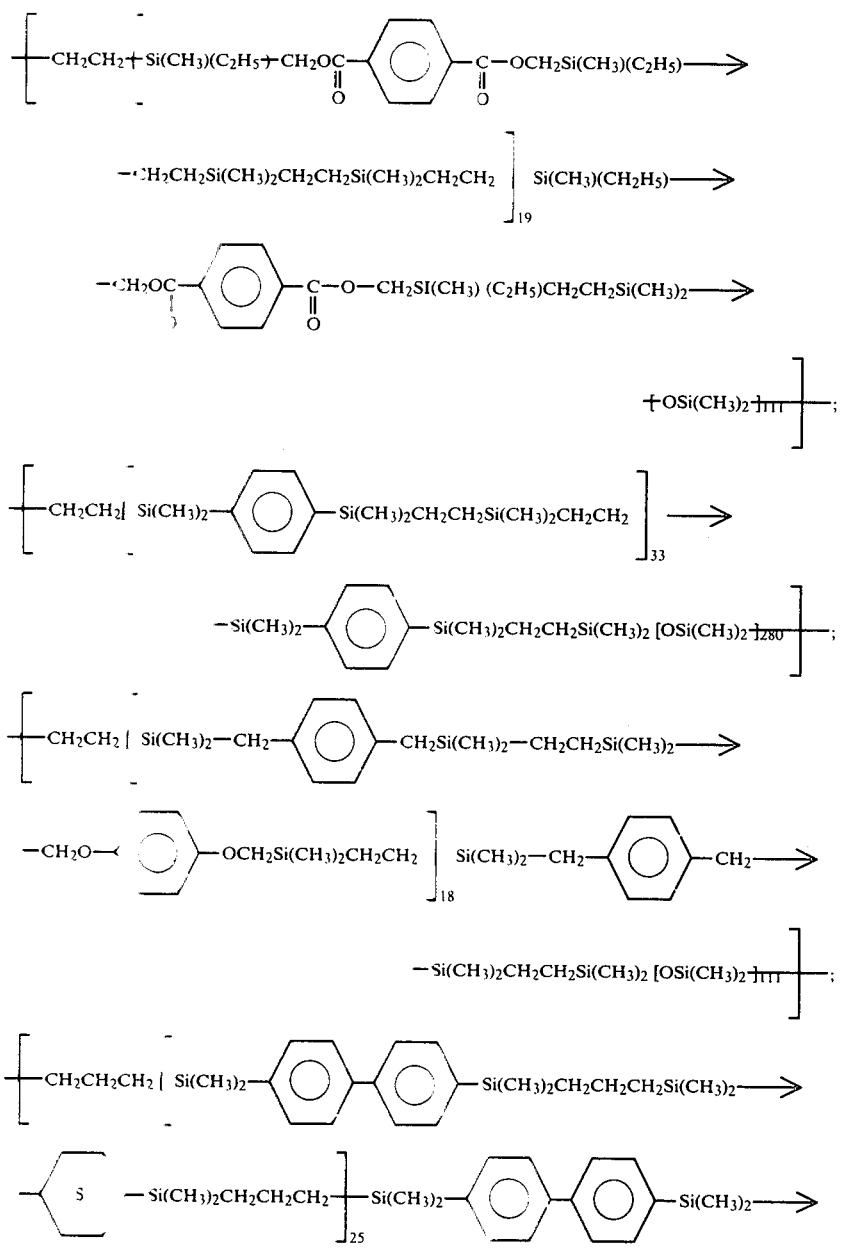

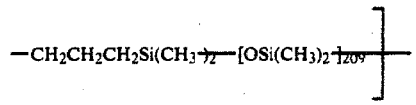

wherein the symbol S indicates a saturated ring;

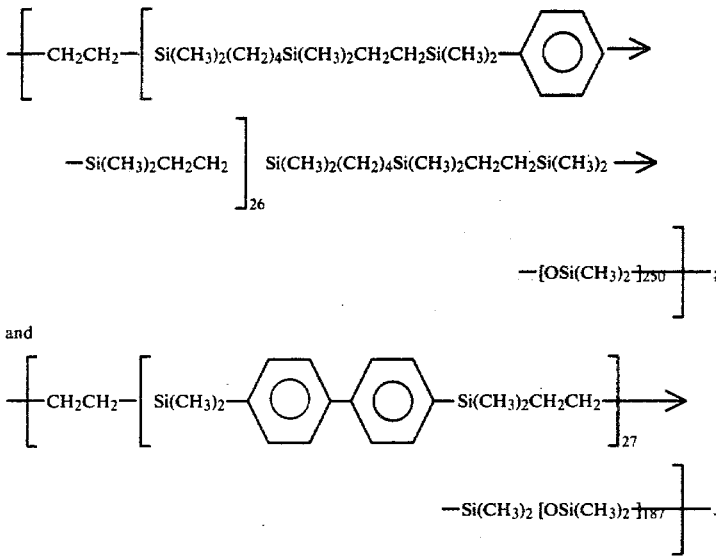

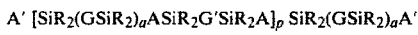

and

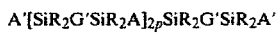

formula $A'SiR_2(OSiR_2)_nA'$, and wherein the above

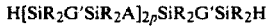

28. A process for the preparation of a block copolymer comprising the structural formula $F_1$ units as defined by claim 18 wherein:
   (i) a crystalline organosilicic copolymer having the structural formula $F_i$:

$A'[SiR_2(GSiR_2)_aASiR_2G'SiR_2A]_p SiR_2(GSiR_2)_aA'$ is prepared by polyaddition of p+1 units of the diethylenic organosilicic compound of the formula $A'SiR_2(GSiR_2)_aA'$ and p units of the dihydrogenated organosilicic compound of the formula $HSiR_2G'SiR_2H$, and
   (ii) at least one unit of the organosilicic copolymer of the formula $F_i$ is then reacted with at least one unit of the α,ω-dihydrogenopolydiorganosiloxane of the formula $HSiR_2(OSiR_2)_nH$, and wherein the above formulae, the symbols A, R, G, G', a, p and n have the meaning of the symbols included in the formula $F_1$, and the symbols A', which are identical, represent linear or branched chain alkenyl radicals having from 2 to 6 carbon atoms, or cyclohexenyl radicals.

29. A process for the preparation of a block copolymer comprising the structural formula $F''_1$ units as defined by claim 18, wherein:
   (i) a crystalline organosilicic copolymer having the structural formula $F_h$:

$H[SiR_2G'SiR_2ASiR_2(GSiR_2)_aA]_pSiR_2G'SiR_2H$ is prepared by polyaddition of p+1 units of the dihydrogenated organosilicic compound of the formula $HSiR_2G'SiR_2H$ and p units of the diethylenic organosilicic compound of the formula $A'SiR_2(GSiR_2)_aA'$, and
   (ii) at least one unit of the organosilicic copolymer of the formula $F_h$ is then reacted with at least one unit of the α,ω-diethylenic polydiorganosiloxane of the formulae, the symbols A, R, G, G', a, p and n have the meaning of the symbols included in the formula $F_1$, and the symbols A', which are identical, represent linear or branched chain alkenyl radicals having from 2 to 6 carbon atoms, or cyclohexenyl radicals.

30. A process for the preparation of a block copolymer comprising the structural formula $F''_1$ units as claimed by claim 26, wherein:
   (i) a crystalline organosilicic copolymer having the formula $F'_i$:

$A'[SiR_2G'SiR_2A]_{2p}SiR_2G'SiR_2A'$ is prepared by polyaddition of the hydrogenomonoethylenic organosilicic compound of the formula $A'SiR_2G'SiR_2H$ with itself 2p times, in the presence of one unit of a compound of the formula $A'SiR_2G'SiR_2A'$ as the blocking element, and
   (ii) at least one unit of the copolymer of the formula $F'_i$ is then reacted with at least one unit of the α,ω-dihydrogenopolydiorganosiloxane of the formula $HSiR_2(OSiR_2)_nH$, and wherein the above formulae, the symbols A, R, G, G', a, p, and n have the meaning of the symbols included in the formula $F_1$, and the symbols A', which are identical, represent linear or branched chain alkenyl radicals having from 2 to 6 carbon atoms, or cyclohexenyl radicals.

31. A process for the preparation of a block copolymer comprising the structural formula $F''_1$ units as defined by claim 26, wherein:
   (i) a crystalline organosilicic copolymer having the structural formula $F'_h$:

$H[SiR_2G'SiR_2A]_{2p}SiR_2G'SiR_2H$ is prepared by polyaddition of the hydrogenomonoethylenic organosilicic compound of the formula A'-SiR$_2$G'SiR$_2$H with itself 2p times, in the presence of one unit of a compound of the formula HSiR$_2$G'SiR$_2$H as the blocking element, and (ii) at least one unit of the copolymer of the formula F'$_h$ is then reacted with at least one unit of the α,ω-diethylenic polydiorganosiloxane of the formula A'SiR$_2$(OSiR$_2$)$_n$A', and wherein the above formulae, the symbols A, R, G, G', a, p and n have the meaning of the symbols included in the formula F$_1$, and the symbols A', which are identical, represent linear or branched chain alkenyl radicals having from 2 to 6 carbon atoms, or cyclohexenyl radicals.

32. A process as defined by claims 28, 29, 30 or 31, wherein each reaction is carried out in the presence of a metal catalyst or of inorganic or organic derivatives thereof, said metal being selected from the group consisting of platinum, palladium, ruthenium, rhodium, and iridium.

33. A process as defined by claim 32, wherein each reaction is carried out in a solution or suspension of an inert organic solvent selected from the group consisting of aliphatic and cycloaliphatic hydrocarbons, halogenated ,erivatives thereof, aromatic hydrocarbons, and halogenated aromatic hydrocarbons.

34. A process as defined by claim 33, wherein the second stage reaction takes place in the homogeneous reaction medium of the first stage, without first isolating the organosilicic copolymer F$_i$, F$_h$, F'$_i$ or F'$_h$.

* * * * *